US006853328B1

(12) United States Patent
Guice et al.

(10) Patent No.: US 6,853,328 B1
(45) Date of Patent: Feb. 8, 2005

(54) AIRBORNE BIOTA MONITORING AND CONTROL SYSTEM

(76) Inventors: David L Guice, 230 Haden Rd., Brownsboro, AL (US) 35741; Augustus H. Green, P.O. Box 270, New Market, AL (US) 35761; William V. Dent, 2011 Alexander Dr. SE., Huntsville, AL (US) 35801

(*) Notice: Subject to any disclaimer, the term of this patent is extended or adjusted under 35 U.S.C. 154(b) by 0 days.

(21) Appl. No.: 10/721,112

(22) Filed: Nov. 25, 2003

Related U.S. Application Data

(63) Continuation-in-part of application No. 09/571,295, filed on May 14, 2000, now Pat. No. 6,653,971.
(60) Provisional application No. 60/134,081, filed on May 14, 1999.

(51) Int. Cl.[7] ............................. G01S 13/88; A01M 1/22
(52) U.S. Cl. ............................. 342/54; 342/22; 342/27; 342/28; 342/52
(58) Field of Search ............................. 342/22, 27, 28, 342/52–56, 59, 175, 90, 192–197; 250/493.1, 494.1, 495.1; 73/587; 43/107, 112, 121, 124, 132.1, 133, 138, 144; 356/4.01–5.15

(56) References Cited

U.S. PATENT DOCUMENTS

| | | | | |
|---|---|---|---|---|
| 4,091,367 A | * | 5/1978 | Harman | 342/27 |
| 4,963,888 A | * | 10/1990 | Taylor, Jr. et al. | 342/90 |
| 5,012,113 A | * | 4/1991 | Valentine et al. | 250/493.1 |
| 5,134,410 A | * | 7/1992 | Shrader | 342/90 |
| 5,343,652 A | * | 9/1994 | Johnson | 43/132.1 |
| 5,774,088 A | * | 6/1998 | Kreithen | 342/22 |
| 6,653,971 B1 | * | 11/2003 | Guice et al. | 342/54 |

* cited by examiner

*Primary Examiner*—Bernarr E. Gregory
(74) *Attorney, Agent, or Firm*—Mark Clodfelter

(57) ABSTRACT

A method and system for identifying harmful airborne biota, particularly insects, and including plant material, such as mold spores and pollen, and flying insects and birds and either killing or disabling the harmful airborne biota is disclosed. Lasers, radar, and other types of radiation may be used to illuminate at least a perimeter around assets to be protected, with radiation returns detected and applied to a pattern classifier to determine whether the detected insects of interests are harmful, benign or beneficial. In the event the insects are determined to be harmful, a variety of measures responsive to the radiation returns may be taken to eliminate the harmful insects, these measures including firing pulses of beamed energy or radiation of a sufficient intensity to at least incapacitate them, or mechanical measures such as controlled drone aircraft to track and kill the pests.

12 Claims, 19 Drawing Sheets

12a

24

AIRBORNE BIOTA MONITORING AND CONTROL SYSTEM

CROSS REFERENCE TO RELATED APPLICATIONS

This application is a continuation-in-part of U.S. application Ser. No. 09/571,295, filed May 14, 2000, and which issues as U.S. Pat. No. 6,653,971 on Nov. 25, 2003, and which claims the benefit of U.S. provisional patent application No. 60/134,081, filed May 14, 1999.

FIELD OF THE INVENTION

This method and system relates generally to insect and pest monitoring and control, including other forms of airborne biota, and particularly to use of radar, laser, and other optical sensors for detection and discrimination between insect pests and beneficial insects. Precision kill technologies may be utilized to timely kill or disable airborne biota identified as harmful to protected assets. The method also provides for detection of insect pests or pest activity within the protected volume using traps and miniaturized sensors and telemetry systems, and on crop plants or production animals using laser vibrometry and other laser and optical sensors. In some embodiments, the method can be practiced as a video game wherein remotely located participants control kill devices (e.g., lasers, high-power microwave (HPM) devices, remote control or robotic aircraft) against active insect targets or other pests in a real-time environment so as to kill or sufficiently disable pests to prevent them from breeding or engaging in destructive activity.

BACKGROUND OF THE INVENTION

At present, economic losses in crops and animal products caused by insects and other destructive airborne biota undoubtedly exceed $10 billion annually in the United States alone. It is reported that combined costs of insect damage and control measures exceeded $1.4 billion in cotton production alone in 1997. Insects and other arthropods and biota (e.g., fungal spores, bacteria, viruses) cause direct damage to food, fiber, and animal products and plants. Additionally, mosquitoes, flies, and the like also transmit diseases which adversely affect humans and other animals and plants. Losses further extend to orchards and forestry products, and ornamental plants and lawns. Costs further associated with insect pests and other harmful biota include costs associated with insect scouting and control measures. Control measures frequently employ pesticides or the like which also kill beneficial insects, leave residues in food and fiber products, and cause environmental and ecological damage from runoff. Envionmental and ecological damage can also be caused from waste products resulting from chemical pesticide production processes. In food product production animals, it is often necessary to inject antibiotics and other chemicals in order to control pests (e.g., screw worms, hookworms) which have invaded a body of an animal, and such chemicals may cause undesirable side effects or leave residues in products derived from animals.

In many cases, pests are developing tolerance to common pesticides and antibiotics, requiring development of more potent and more selective pesticides and antibiotics which in turn become more expensive. More recently, genetic engineering techniques are being used to introduce genes in some crop species which enable plants themselves to manufacture chemicals within plant material which are toxic to certain insects or other pests. Long term effects of residues and byproducts in human diets, and in the global environment, resulting from use of pesticides, antibiotics, and genetic engineering techniques, and loss of genetic diversity in genetically engineered crops (due to the expense in developing multiple transgenic varieties), are matters of considerable concern and debate. Biological controls employing parasites or disease organisms specific to certain insect pests are currently used in some areas, but use of biological controls suffers in many cases from the lack of timely information on populations, behavior, and movement of targeted pests.

In addition to pests, the overall insect and biota population in a crop field, animal production area, or other outdoor and indoor (e.g., barn, slaughterhouse or similar areas) environment includes many beneficial insects, or "beneficials," such as bees, parasitic wasps, lady bugs, lacewings, and geocorid bugs as well as other biota such as spiders floating on gossamer threads and some fungalspores and viruses, which are economically important to crops or the ecosystem in general as pollinators or as predators of insect pests. Other insects which may be found in crop fields, animal production areas, and other areas may be neither friend nor foe to a particular crop or production animal, but may be important to other crops or in other areas of the ecosystem. These organisms are designated "neutrals" or "background" insects relative to a specific crop or production animal where they are neither pests nor beneficials. An entire population of insects and other biota in a given region at a given time may be considered to be composed of pests, beneficials, or neutrals relative to a given crop production activity or other activity (e.g., animal production, recreation). For purposes of this application, this aggregated population is designated as a PBN (for pests, beneficials, and neutrals) complex.

Most of the insect species economically important (good or bad) to the production of crops and animal products have an adult stage which is winged and capable of airborne flight. Many fly into crop fields from other nearby host plants and habitats during the growing season when the crop has developed to a stage of their liking, or, in some areas, when the crop is being irrigated and is in a lush condition, and other host plants outside crop fields are drying up. Other insect pests may fly randomly about an animal production environment, such as a feedlot operation, seeking to lay their eggs, or suck blood, causing pain and stress to animals, reducing productivity, and frequently spreading diseases or other parasites. Some, especially moths, may migrate over extremely long distances (hundreds of kilometers), aided by atmospheric winds, to later land in crops and other areas and lay eggs or otherwise cause damage. In many insect species, it is the larval stage of the insect pest which causes the damage. In other species, nymph and adult stages cause the damage and spread diseases, and in some species (e.g., boll weevil), both larval and adult species cause damage.

It is important that control measures (i.e., means of killing, incapacitating, or repelling pests) minimize negative impacts on beneficial insects and other beneficial biota such as bats, most birds, or even pollen grains for production crops. Also, it is generally desirable, from an ecological viewpoint, that control measures also minimize negative collateral effects on the "neutrals" as well.

Current methods of dealing with most pests in crops involve use of crop entomological or agronomical human scouts who have knowledge, experience, sample collection tools, and sampling techniques to identify which species of pests (including harmful fungal and disease organisms in addition to insect pests), as well as beneficial species (also including some fungal and disease organisms which attack pests), are present, and estimate their relative numbers or concentrations. In order to determine whether insect pest population buildup is occurring, and to determine the need for control measures, or whether control measures are being effective, it is important to estimate actual (by traps, sweep nets, direct observation, etc.) or potential (from egg lays) populations of insect pests as well as populations of their respective predators (beneficials). After considering the populations of specific pests estimated to be present in the field or other environment, and populations of their respective predators, decisions are made concerning application of pesticides or other control measures such as releasing additional predators. Economics of labor-intensive crop scouting generally permit sampling only once per week or so, and then only at relatively few sampling sites within the field environment. In some cases, pest populations are also monitored by the use of baits and traps employing general attractants (sweet substances, putrid substances, ultraviolet light, etc.) or species specific attractants, such as sex attractant pheromone chemical complexes which are generally species specific. Generally, such traps must be manually inspected and emptied to determine the species and numbers of insects trapped. Vicki et al (U.S. Pat. No. 5,005,416) describe a pitfall trap employing vibration detection to detect presence of insects in the trap and suggest that the trap might be used with a radio telemetry device. However, they do not describe an overall system concept within which such a telemetry-equipped trap might be used in a field crop or animal production environment, nor do they describe specifics of a telemetry device which might make such an application economically feasible. Many researchers have noted insect activities (e.g., flying, crawling, chewing, chirping) in crops, crop storage bins, and other areas are frequently accompanied by sounds or vibrations detectable by microphones or vibration transducers. Other researchers (e.g., Claridge 1985; Bell 1980) have noted that certain species of insects (e.g., leafhoppers) create vibrations in plants by thumping on the leaves or other plant elements with their legs or by other means, which vibrations travel through the plant material and structure where they may be detected by other insects (perhaps mates or perhaps predators). Various researchers have confirmed presence of such vibrations in laboratory environments using various means, including use of an instrument called a laser Doppler vibrometer (LDV) or sometimes simply laser vibrometer (e.g., Michelsen 1982). A laser Doppler vibrometer typically operates by modulating a transmitted laser beam with an RF signal by use of a Bragg cell or similar mixing device, directing a modulated signal onto a leaf surface or other surface to be monitored for vibrations, gathering light scattered from a surface material with suitable optics, mixing a returned laser signal first with a replica of the laser (carrier) wavelength (as in heterodyne detection) to recover an RF mixing frequency, then mixing the thus recovered (received) RF signal with a replica of the original RF mixing frequency to recover any additional modulations impressed on the composite laser and RF signal scattered from the sampled surface, which additional modulations may be caused by Doppler effects resulting from the relative motions of the surface with respect to the laser source or by other modulation sources, such as atmospheric effects (e.g., scintillation effects) on laser propagation. The detection circuits for the residual vibrations are typically designed so that an output voltage is proportional to the Doppler shift of the signal—see, for example, an Instruction Manual accompanying the Dantec DISA 55x-Laser Vibrometer. Although laser vibrometer instruments have been used by researchers in laboratories to study insect behavior and communications, laser vibrometry has apparently not been previously considered for adaptation for use in monitoring crops for evidence of insect activity, or for other potential applications in monitoring crop health and status, as proposed by Applicants.

Numerous techniques other than chemical pesticides have been employed or proposed for control of insects. Sometimes baits and traps are used for insect population control as well as population sampling. Such methods may be relatively effective indoors but are generally less effective, or costly to implement and maintain, in large field crop environments. Some have proposed use of lasers and other directed energy devices to kill insects, but have not described how such technologies could be employed safely in a field crop or animal production environment, or how lasers could be used without killing or injuring significant numbers of beneficial or neutral insects as well as pests. Johnson (U.S. Pat. No. 5,343,652) suggests that a laser beam could be scanned throughout a crop field with an energy level high enough to injure at least some sensory organs of insects, but does not reveal how injury to beneficial insects such as honeybees would be avoided. Johnson also suggests that a laser beam having sufficient power to incapacitate or kill an insect could be scanned through a crop without substantially harming crop plants, but offers no data to substantiate this statement. In fact, the growing tips and fruit setting blossoms of plants are quite sensitive and would probably be damaged by a laser used as proposed by Johnson, or by high power microwave energy used in a similar way. Some plants are also sensitive to exposure to light, using the durations and other properties of light exposures to trigger or alter various metabolic processes. In suggesting that the laser beam be scanned just above the crop to contact and kill or injure insects, Johnson also acknowledges this embodiment should be used only in remote areas so that accidental exposure of a human or non-target animal is avoided. Further, indiscriminate use of laser beams to attract and kill or incapacitate insects, as proposed by Johnson, would likely result in injury to eyes or other organs of beneficial insects, birds, and bats as well as people and other animals. In fact, implementation of such an approach would likely be prohibited by the Food and Drug Administration (FDA), the Federal Aviation Administration (FAA), the Occupational Safety and Health Administration (OSHA), or other regulatory organizations which impose strict limitations on the use of unconfined laser beams in outdoor environments. Sensor technologies that detect initial incoming adult stage of arriving insects or other pests and provide a useful level of discrimination between potentially harmful and non-harmful insect species could, as a minimum, permit more timely and effective crop scouting. By "useful level of discrimination," we mean a capability to provide a level of discrimination useful either in terms of supporting more effective scouting (knowing, for example, when a flight of moths has arrived in a field, even though specific moth species is not determined by sensor technologies) or which is useful in supporting decisions on selection and employment of specific control measures. For example, ability of a set of sensors to distinguish moths from wasps and honeybees, and estimate gross populations of each group (i.e., all moths, all wasps, etc.) would not, in and of itself, be adequate information to support a decision to make a pesticide application without identification of specific species present and confirmation of their populations by scouts. However, such sensors may be very useful in signaling arrival of a migratory flight of moths, and thereby alerting a crop producer or his entomological consultant of a need to scout a field in question to determine whether populations of specific pest species exceed thresholds for a pesticide application decision. Information from such sensors on quantity of wasp-like insects observed in, or entering or leaving, a particular field would also be useful in estimating a balance between pests and their predators to support a pesticide application decision.

When a modest sensor capability to detect insects in flight and simply discriminate potentially harmful insects (e.g., moths) from other airborne biota (e.g., wasps, honeybees, and June bugs) is combined with knowledge, for example, that there are virtually no moths which are beneficial, or at least economically important, to most crops (e.g., cotton), the silkworm moth being an obvious exception, an opportunity is opened for a control strategy which may simply destroy or incapacitate all moths (of a certain size range) which are observed entering a crop field of a crop for which there are no beneficial moths. Thus, in this example, the synergistic combination of even a modest discrimination capability with an immediate, precision kill technology would provide a significant benefit in preventing damage to crops by moth pests. Killing or incapacitating moths or other pests before they enter the crop and lay eggs also has significant advantages over most conventional control techniques which attempt to control pests only after they have entered the field and established certain threshold populations which then need a pesticide application. The utility of such a capability is enhanced by extension of the capability to distinguish among (i.e., perform "classification" of, or "discrimination" between) other insect pests, beneficials, and neutrals.

It has been established by other researchers that even modest radars, such as modified marine radars, are capable of detecting insects in flight and measuring selected parameters (e.g., wing beat frequency, amplitude vs polarization, overall radar cross section) which support at least a partial classification separation of different species (e.g., most moths from most wasps). Schaeffer (R.E.S.(Royal Entomological Society) Symposium 7, Insect Flight, 1976), for example, reported that, by using a modified X-band marine radar, he was able to collect radar returns from locusts and butterflies flying overhead which would permit him to distinguish one from the other by performing Fourier transforms on amplitude time histories observed in a series of returns from radar pulses as each respective insect was flying through a radar antenna beam. In the Fourier transforms, it was possible to distinguish peaks at different frequencies corresponding to respective wingbeat frequencies of a locust and butterfly, and in the data from a locust, other peaks were observed at frequencies attributed to respiration rate of the locust (since, in breathing, shape of the locust's body changes, causing modulation of amplitude of the radar cross section, and hence changes in the amplitude of a radar return, at periodic cycles corresponding to the respiration rate). Most researchers in this field believe that ability to detect wingbeat frequencies is due to changes in shape of an insect's body as it flies, rather than being due to radar returns from wings themselves, since material in insect wings is virtually transparent to radar frequencies used in past measurements (Schaefer, 1976). Wolf (personal communication, 1998) reports that he has been able to observe individual moths and boll weevils in flight at altitudes well above crops and other vegetation (avoiding a ground clutter problem), and has also identified several measurements which can be made by radars to aid in the classification of an observed insect as being a moth as oposed to, for example, a wasp. However, when only conventional pest control measures employing chemical pesticides are available, because of the environmental concerns and the regulatory controls being applied to prevent unnecessary or excessive use of chemical pesticides, it is becoming essential to also know specific species of moths present in a crop field.

As noted earlier, another key limitation in use of radar for insect detection and monitoring applications is that, when insects descend to too low a level (e.g., less than ten to twenty feet above a ground level or crop canopy), or originate or maintain flight at a low level above the ground or vegetation (e.g. grass, crop canopy), as when flying into a crop from weeds or other plants in the vicinity of the crop), insects generally can not be detected by conventional radar since the amplitude of "clutter returns," resulting from inevitable sidelobes of a radar antenna pattern illuminating the ground and vegetation in the same range cells as insect targets, will generally exceed amplitude of the return from an insect, so that insect signal-to-noise-plus-clutter ratio is below detectable limits. Since some clutter returns generally occur from the same ranges as targets, use of range gating in the radar cannot eliminate the clutter. Even when more sophisticated radars employing Doppler measurement capabilities and advanced signal processing are employed, Doppler spread resulting from motion of vegetation due to wind, heliotropic tracking, and growth will frequently interfere with detecting Doppler shifted or Doppler spread return from an airborne insect. Costs of radars also increase appreciably when very stable oscillators and other components are required to support more sophisticated measurements and signal processing which may be needed for suppression of clutter and other noise sources.

As stated, a laser beam may be scanned rapidly over a crop to detect insects, as suggested by Johnson. However, the top of the crop canopy is not a well-defined plane, but includes multiple growing plant tips standing with random height variations of 0.5 meters or more, and with significant room between the plant tips. Once moths and other insect pests enter a crop, they are "at home" and have little requirement to fly higher than the growing tips of the crop plants. Consequently, pests generally spend little if any time in flights higher that the growing tips of the plants, and there is little opportunity to detect and contact such pests once they have "settled into" a crop. Most beneficial insects, however, have nests or other domiciles outside the crop, only entering the crop to collect nectar (and thereby aiding pollination) or to seek out insect pests (e.g., larvae, grubs, or caterpillars, and in some cases adult insects) dwelling and feeding on the crop plants. Since beneficials are generally traveling further distances to enter a field and return to their generally out-offield domiciles, and since pollinators are generally working flowers of the crop, which are generally located near the top of the crop, beneficial insects are generally more likely to be flying higher, above growing tips of the plants, than are the pests. Consequently, a laser beam simply scanned above the top of the crop is more likely to contact and injure beneficial insects than insect pests. As noted earlier, Johnson did not disclose a need or a method for distinguishing insect pests from beneficial insects and neutrals. Even if a laser alone is used to perform initial detection of an insect, information from individual "hits" on the insect as the laser scanned the field would not be sufficient to collect observational data needed to support classification of a "target" as pest or non-pest. Consequently, simply using a laser beam alone to scan a field and contact and injure insects, as suggested by Johnson, would have limited effectiveness in detecting insect pests "working" the crop, and would probably be more likely to injure beneficial insects than pests.

As described above, radar and ladar sensor technologies separately have some capabilities for detecting insects in flight above a crop, but also have significant limitations when employed separately to detect insect pests present within crops. When radar is deployed in a crop field environment as described in the literature, it has significant difficulty in simply detecting insects in or just above a crop, much less obtaining measurement data needed to support classification. Johnson did not disclose any capability for classification of insects, nor for providing for safe use of lasers in a field crop environment (other than suggesting that they be used only in remote locations).

The instant invention takes advantage of synergistic combinations of radar and laser sensor technologies with other features of the invention relating to specific geometries and use of special configurations and materials which enhance capabilities of radar and laser sensors to overcome clutter and background noise problems to detect insects and other airborne biota and provide measurement information to permit a useful degree of classification as pest, beneficial, or neutral. The invention also includes, in some embodiments, use of additional observations and measurements by other optical sensors (e.g., hyperspectral or multispectral sensors, or sensors capable of monitoring intensity ratios of selected spectral lines or bands). Another major synergistic combination occurs in enhanced embodiments wherein immediate precision kill technologies directed generally against individual insects or other airborne biota specimens classified as pests are integrated with detection and classification capabilities provided by combined radar and optical sensors. An integrated system embodiment based on methods of the present invention can detect, classify, and kill or incapacitate insects and other airborne pests before they enter a crop or animal production environment and lay eggs or otherwise begin their damage.

When such sensor technologies as advanced radar and ladar, which are capable of determining location of individual airborne insects and which together or in conjunction with other optical sensor technologies are capable of providing remotely sensed measurements which can support a classification schema capable of distinguishing most insect pests from beneficial or neutral insects, are combined with advanced control technologies which can destroy or incapacitate an adult pest before eggs are laid or damage is inflicted on protected assets, the resulting system has a major advantage over techniques and technologies which must wait until eggs are laid and/or plant and fruit damage is incurred to determine which specific species are present and which pesticides should be applied (and are permitted by regulations) for that species

SUMMARY

A crop field or other area over which airborne biota such as insects are to be detected is enclosed by a series of planes of predetermined thickness. These planes are defined by backstops constructed of a material that absorbs or otherwise prevents returns from an energy beam directed thereagainst. A plurality of directed energy transmitters transmit energy beams within these planes or over these planes so that one or more insects or other objects passing through these planes develop one or more return energy reflections. These return energy reflections are received by one or more receivers associated with one or more respective transmitters, and one or more signal processors coupled to the one or more receivers are programmed to detect and respond to the reflection from the insect in accordance with sensed reflected returns.

DETAILED DESCRIPTION OF THE INVENTION

Figure 1:
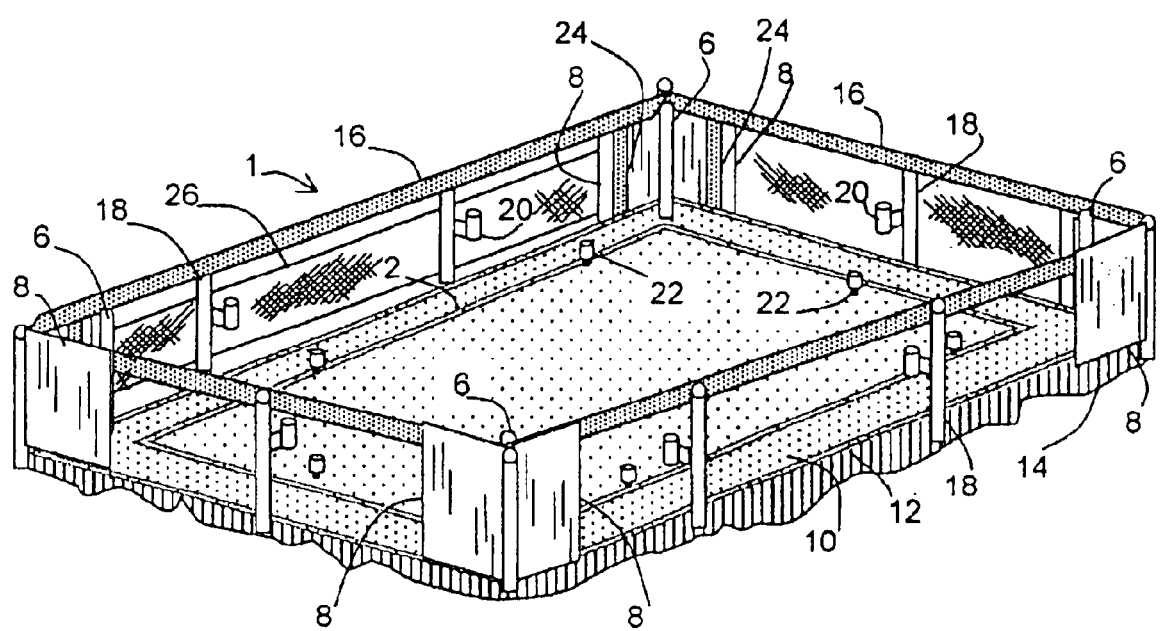
FIG. 1 is a diagrammatic illustration of an area generally enclosed by a system of the present invention.
Figure 2:
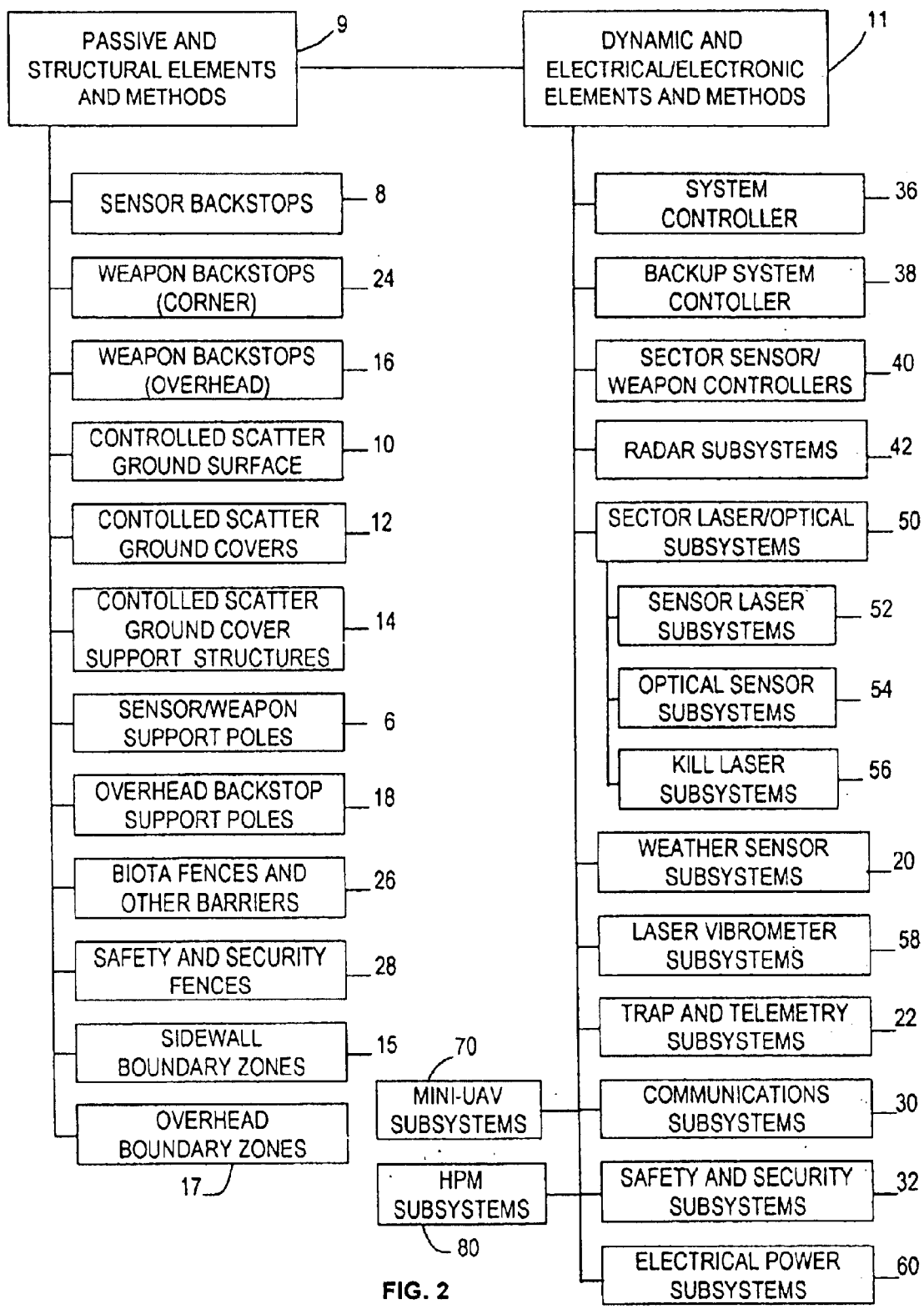
FIG. 2 is a block diagram illustrating representative components of a crop protection system of the present invention.
Figure 3A:
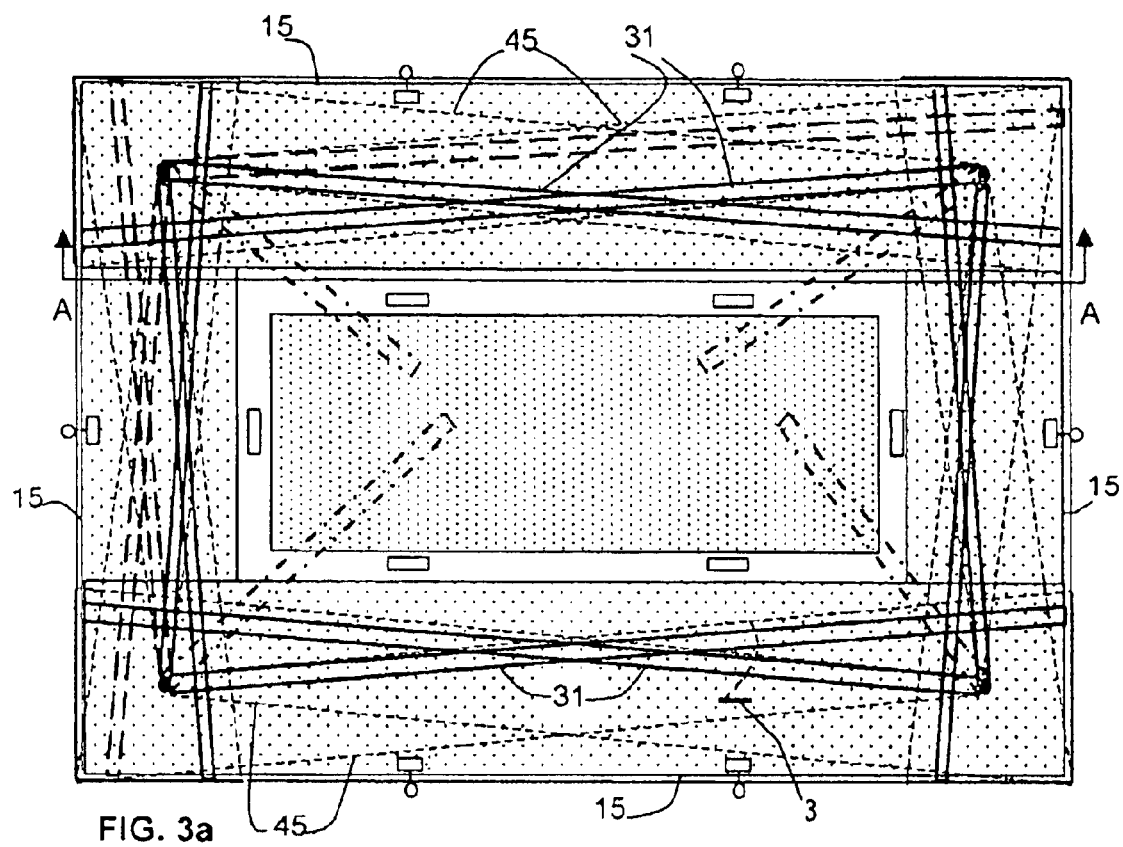
FIGS. 3a and 3b are diagrammatic views of an embodiment of a protection scheme of the instant invention as applied to a crop field showing generally the energy beams and backstops used in the side wall boundary zones.
Figure 3B:
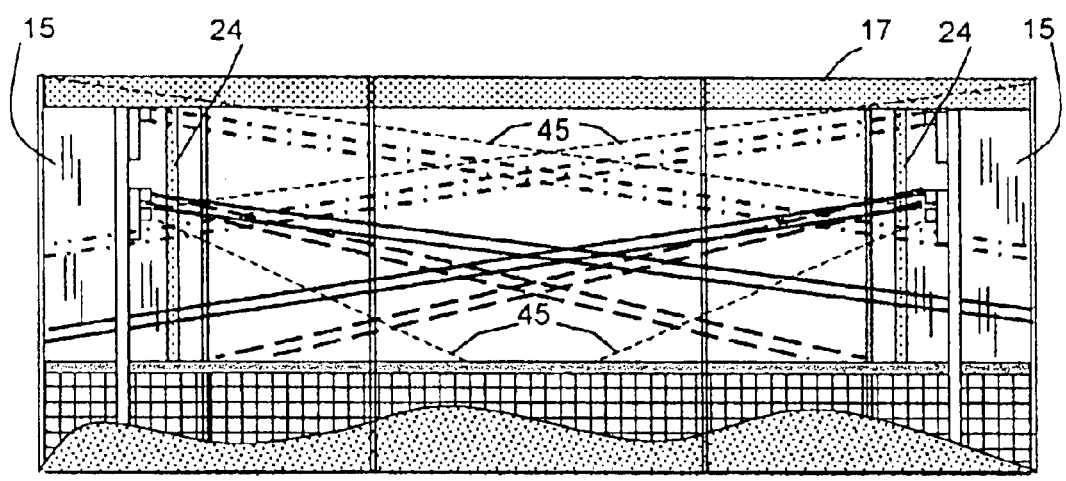
Figure 4A:
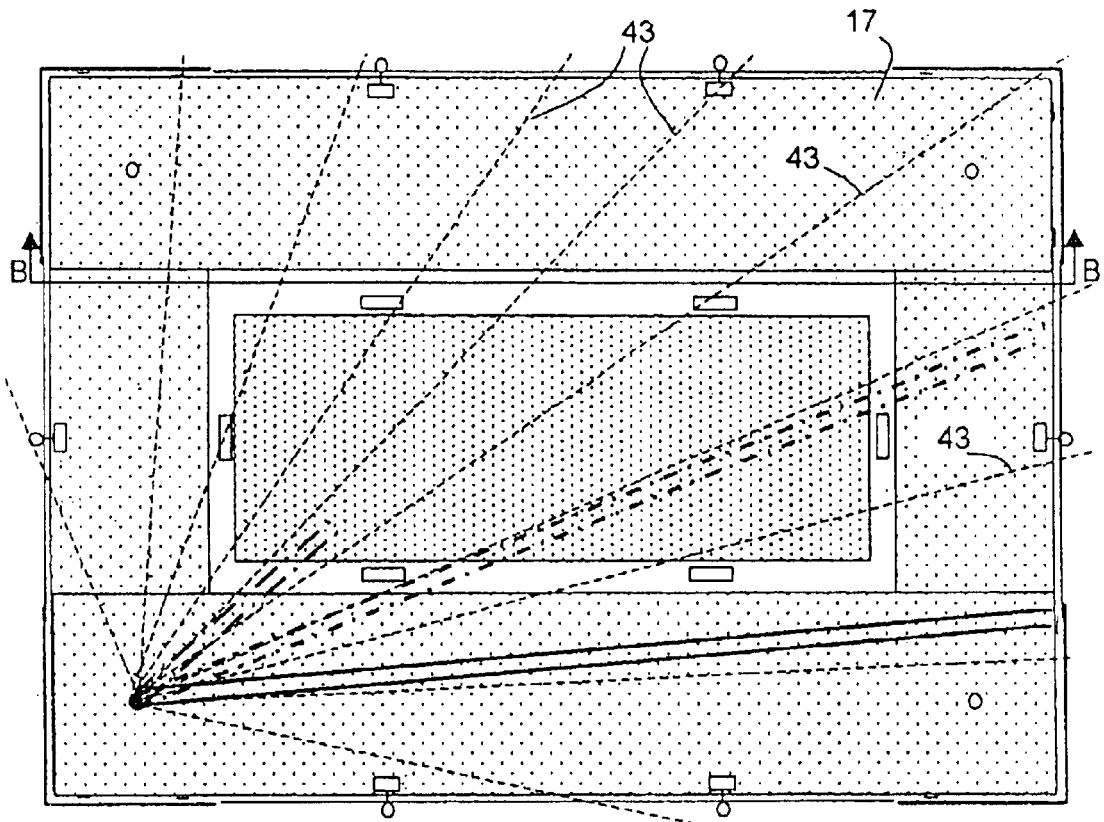
FIGS. 4a and 4b are continuations of the views of FIGS. 3a and 3b but showing generally the energy beams and overhead backstops used in the overhead boundary zone.
Figure 4B:
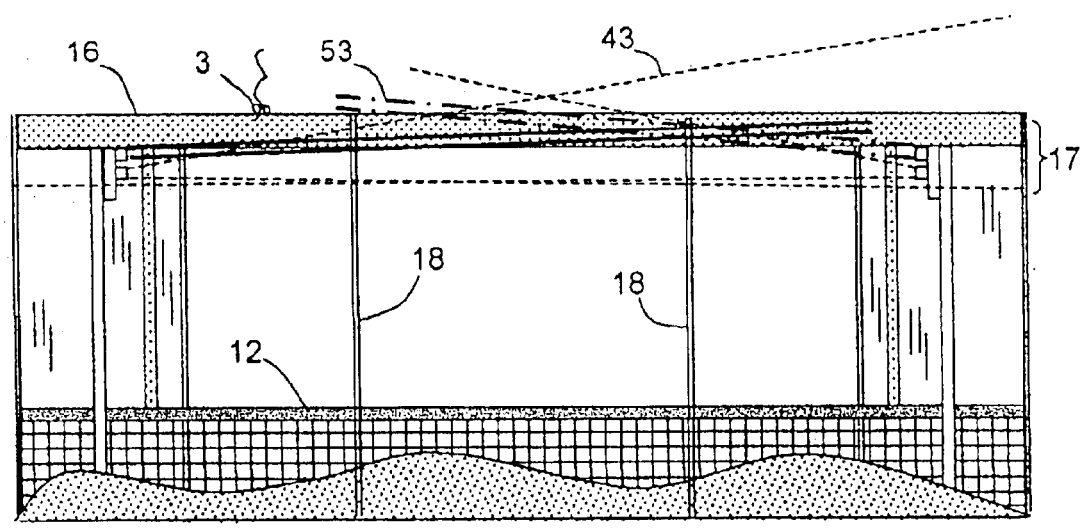
Figure 5A:
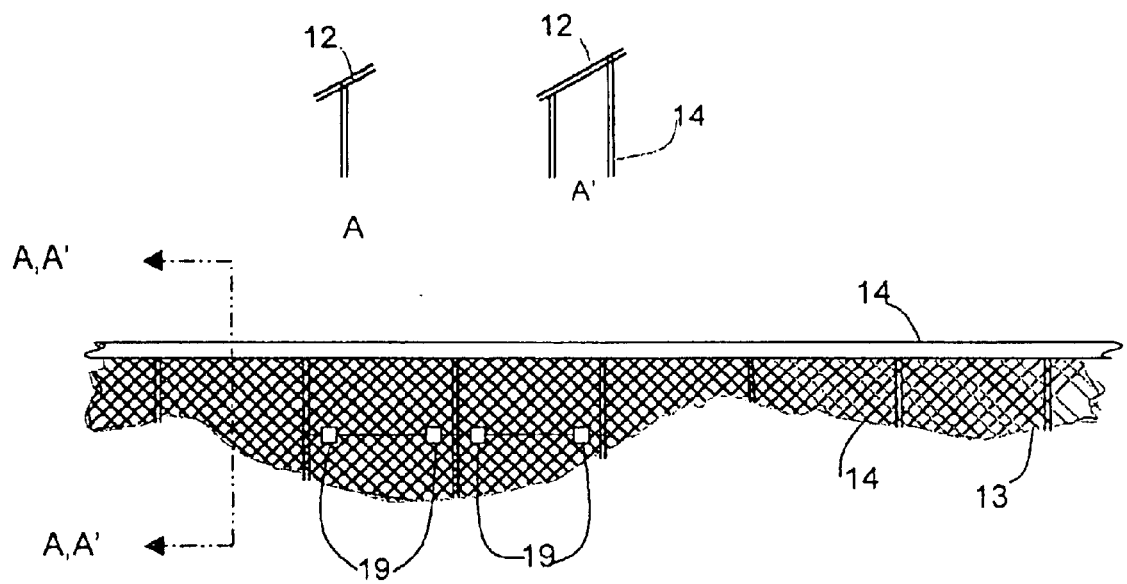
FIGS. 5a and 5b are diagrammatic views illustrating an embodiment for application and adaptation of the controlled scattering surface of the present invention to rough terrain.
Figure 5B:
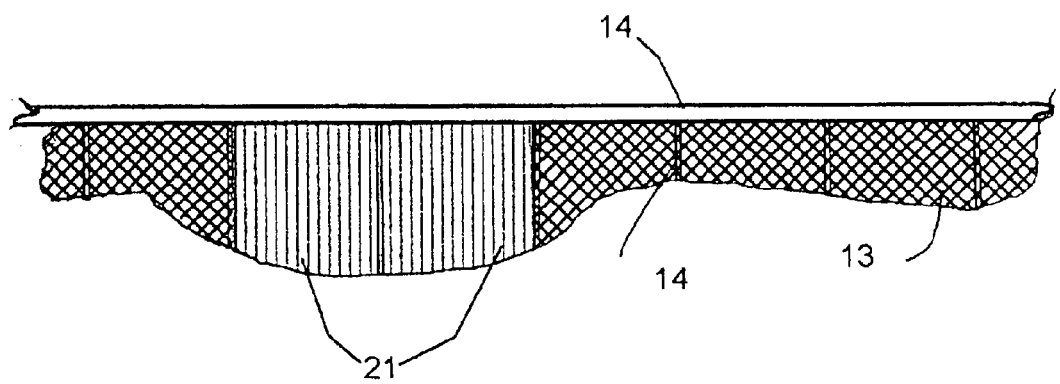
Figure 6:
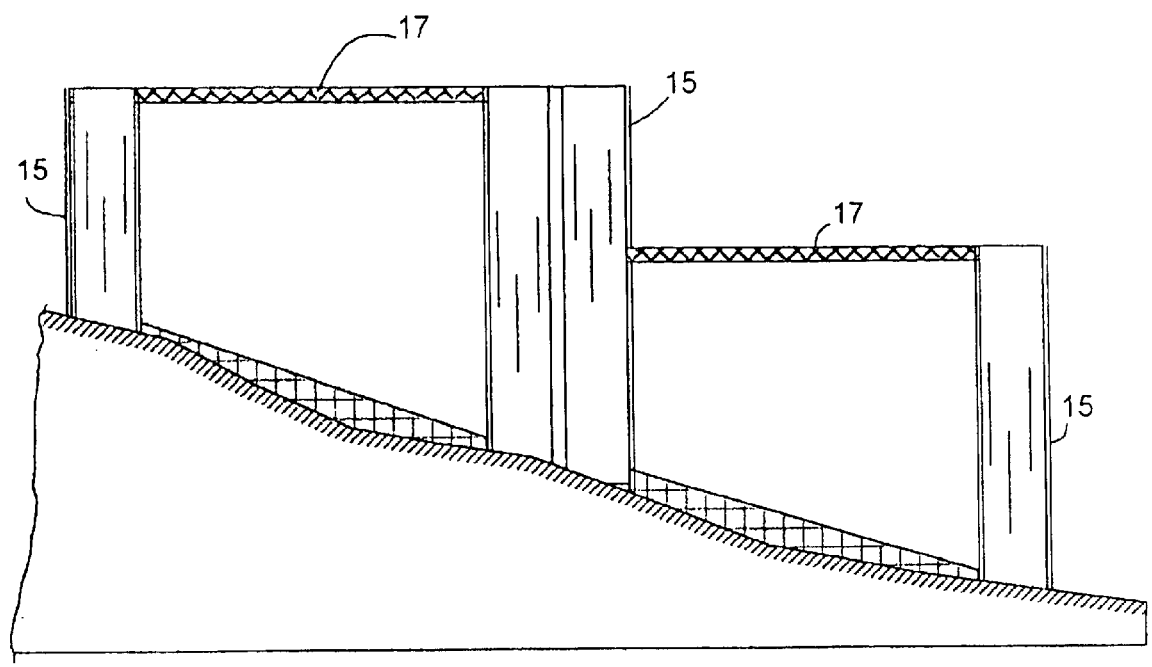
FIG. 6 is an application of the present invention to sloped terrain.
Figure 13A:
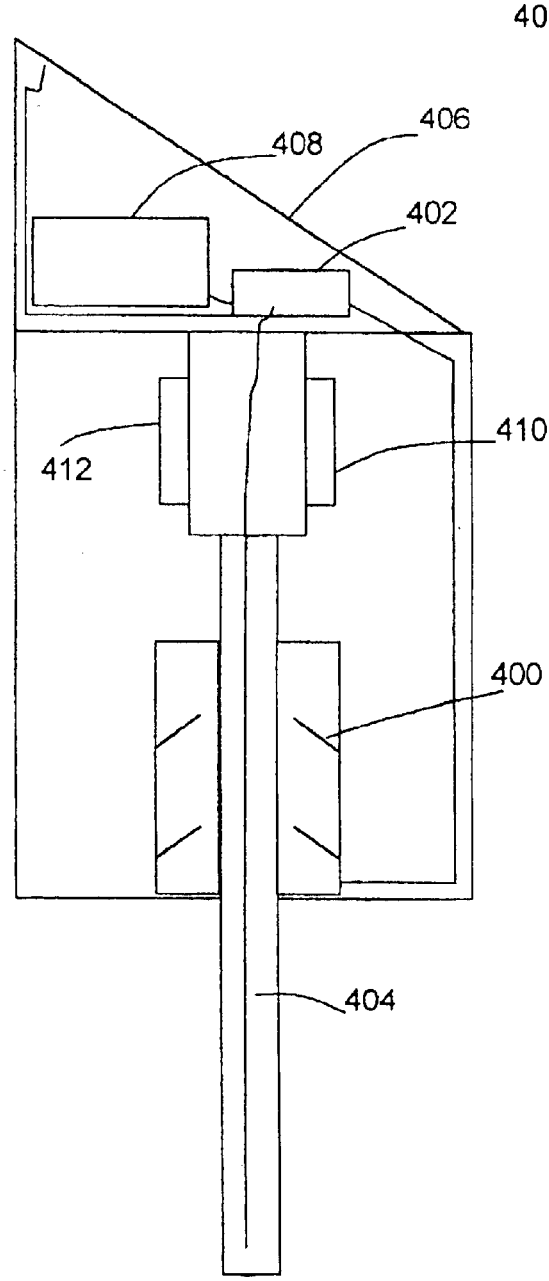
FIGS. 13a and 13b are diagrammatic illustrations of a wireless telemetry insect trap that may be used with the present invention.
Figure 13B:
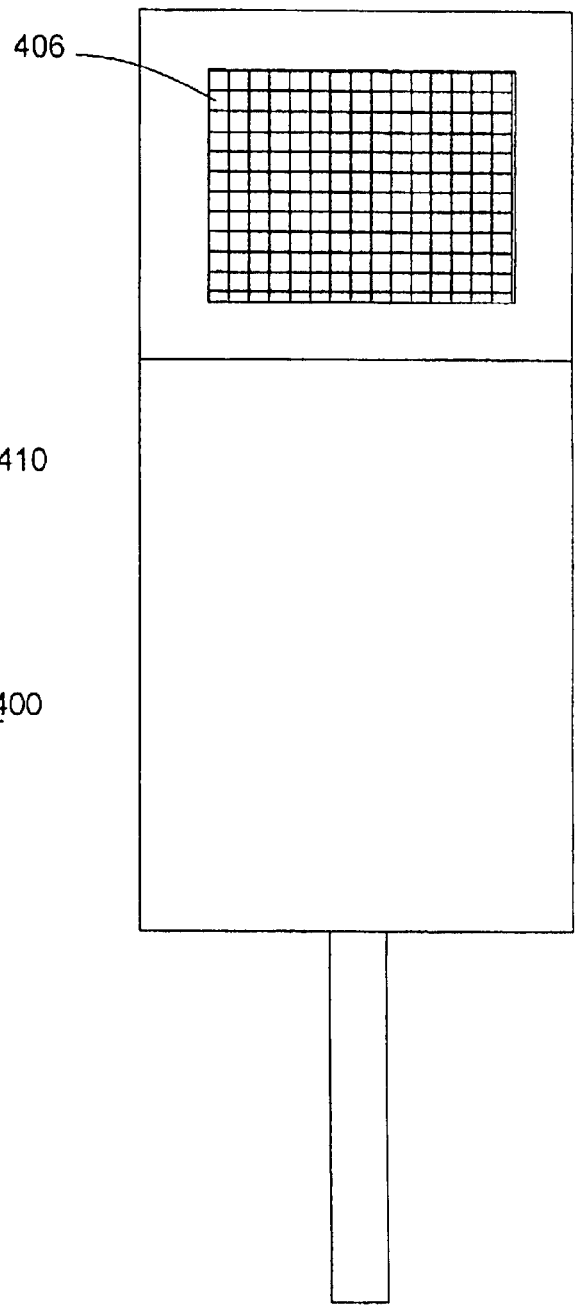

The instant invention combines knowledge of physical and behavioral characteristics of insect pests, beneficials, and neutrals, as well as other biota, with knowledge of capabilities and limitations of several radio frequency (RF) (including radar), optical (including ladar), and semiconductor sensor, processing, and communication technologies. It also provides an innovative method for integrating certain combinations of RF and optical sensor technologies with other materials, procedures, and technologies into an outdoor or indoor environment in a manner which exploits strengths of RF and optical sensor technologies while accommodating their weaknesses to provide an effective and safe system. In various embodiments, the system of the instant invention detects insects and other airborne biota attempting to enter (or in some embodiments, attempting or also attempting to leave) a protected region, volume, or area in a field crop, animal production, orchard, timber, horticultural, plant nursery, recreational, or other environment containing assets for which monitoring of, or protection from, airborne insects and other biota is desired. The system further provides methods to ascertain a useful degree of classification of detected airborne biota specimens as pests, beneficials, or neutrals, or in some cases, simply pests or nonpests relative to the protected assets. In some embodiments, useful estimates of relative numbers of pest, beneficial, and neutral (or simply pests or nonpests) insects and other biota entering, or leaving, or present in, a given environment are provided. Also, in some embodiments, precision control measures such as directed energy weapons including lasers or high power microwave devices, or small remotely controlled unmanned aircraft, may be used to kill or incapacitate insects and other biota identified as pests for given protected assets or environments. In some enhanced embodiments, automated means of monitoring for presence of insect pests and other biota within protected assets or protected volume (e.g., pheromone traps with insect entry sensors and miniaturized wireless telemetry chips, automatically scanning laser vibrometry sensors to detect vibrations induced in plants by insects) are provided in trap and telemetry subsystems 22. An example of a pheromone bait 410 trap employing telemetry is shown in FIGS. 13*a* and 13*b*. This trap uses piezoelectric fibers 400 to generate a voltage when disturbed by an insect entering the trap, which voltage is detected by a micro-sensor chip 402 such as the MIS™ telesensor chip developed by Oak Ridge National Laboratories. The MIST™ telesensor chip is capable of telemetering data via an incorporated antenna 404 from insect detections to receivers located on the poles 6 around the field, providing a measure of how many insects may be penetrating the crop protection provided by the control systems of the instant invention. Power for such traps is provided by a solar panel 406 and battery 408. Insects are killed by a vapor pesticide 412 after entry into the trap. Further yet, in some embodiments, a capability to transmit and display in a remote location, sensor measurements, classification results, and also providing joysticks or other controls whereby human operators can control a laser, HPM, or robotic aircraft kill devices, within certain constraints, to attempt to kill and disable pests, for entertainment or other purposes. Specific features, embodiments, and methods for implementing this remote control concept, which may also be practiced as a video game, are discussed later herein Some key attributes are shown in FIG. 1 of one embodiment of the instant invention for a crop production environment 1. This embodiment makes use of passive and structural elements and methods 9 (FIG. 2) and dynamic and electrical/electronic elements and methods 11 and takes advantage of the knowledge that, in many, if not most, field crop environments, most insect pests or other harmful biota must fly or float into a field crop 2 or other protected environments (rather than first emerging from its overwinter state (e.g., pupae) during the growing season. Even those pests which overwinter in the field and emerge within the field generally emerge before the crop has developed to a condition where it can serve as a host, with the result that insect pests which emerge within a field 2 must generally fly out of the field through boundary zones 15, 17 (FIGS. 2, 3, 4) to find alternate hosts to sustain them until the protected crop has developed to a point they can feed or lay eggs. This embodiment establishes boundary zones 15, 17 around sides and tops of a field crop or other protected asset through which insects must fly to enter the crop or other protected volume. This embodiment then makes it practical to use controlled scattering and absorption of RF and optical sensor energy in boundary zones 15, 17 employing similar principles used in designing stealthy aircraft and ships, to control energy which would otherwise be backscattered as clutter to the RF radar 42 and optical sensors 50. These boundary zones 15,17 may include "sidewall" boundary zones 15 generally running along sides of crop field 2 or other protected volumes and have a nominal height, width, and length, and may be rectangular, trapezoidal, or some other shape in cross-section. "Overhead" boundary zones, which have horizontal extents determined, generally, by horizontal dimensions of a crop field 2 or other protected region, or in some embodiments, by operating ranges of some of RF radar 42 and optical sensor systems 50 used in an overhead boundary zone 17. These overhead boundary zones 17 have a nominal vertical thickness extending from some bottom height, which might typically be 7 to 10 meters above the ground, but which could be significantly higher or lower depending upon terrain and other parameters such as need to clear a top of a building or other structure or equipment within a protected region), to an upper height which is determined, more or less, by antenna 42 and beam patterns 43, 53, respectively, of radar 42 and optical sensors 54 which might typically be 10 meters, more or less, higher than the said bottom height of the said overhead boundary zone. Three or more sidewall boundary zones 15 may be used together with one or more sections of overhead boundary zone 17, including, for example, a stepped terracing arrangement (FIG. 6), so that, taken together, the combination of sidewall 15 and overhead 17 boundary zones completely surround and enclose the protected crop field 2 or other protected asset.

In some embodiments for some applications, especially where a predominant source of pests is from particular directions, it may not be necessary to completely enclose protected assets on all sides, since fewer boundary zones may intercept a greater percentage of incoming pests from a single general direction.

Within these boundary zones, special features of the invention may be implemented in some embodiments to make conditions more favorable for RF and optical sensors of the instant invention to perform detection and provide measurement data to support classification of airborne biota (and thereby provide an airborne biota monitoring and classification system). Within or near these boundary zones, special features of the instant invention are implemented to enhance performance of RF and optical sensors in detecting and classifying airborne biota and to reduce risks associated with use of RF and optical sensors.

Figure 8B:
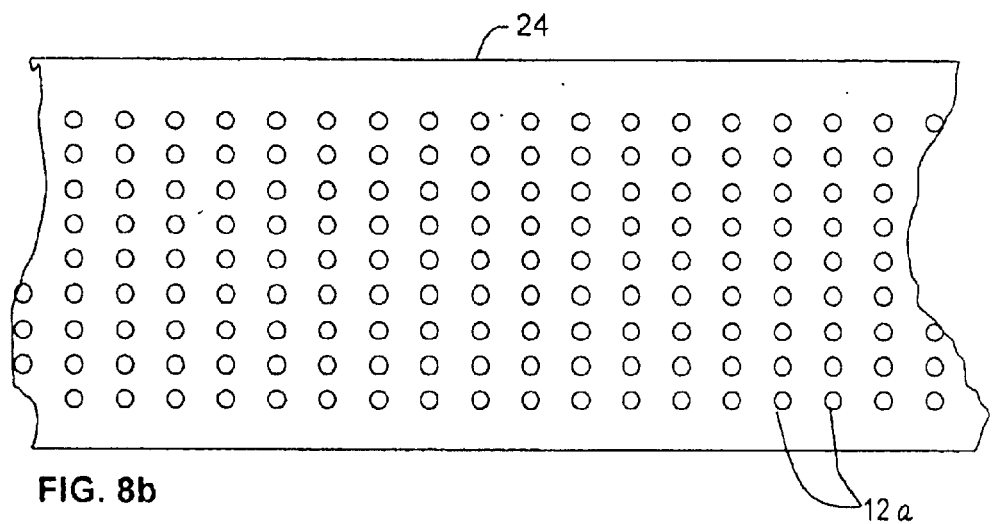
FIGS. 8a and 8b are diagrammatic views of weapon backstop material having a unique optical signature and a tailored laser energy absorption profile.
Figure 8A:
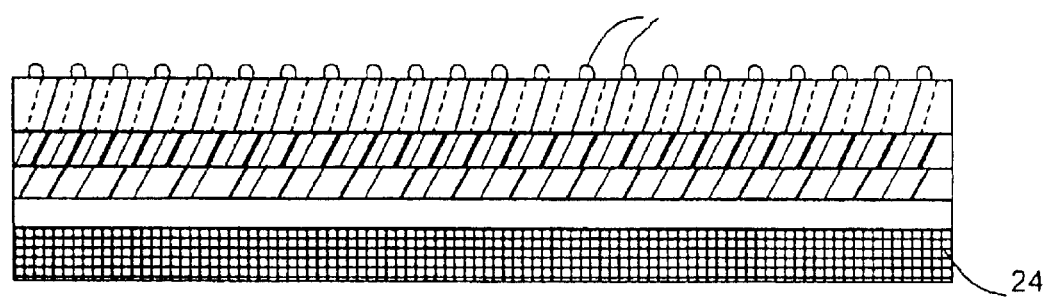

These special features may include leveling and grading to provide a controlled scatter ground surface 10. Knowing a priori characteristics of the terrain over which RF and optical sensors must function, steps may be taken to reduce or eliminate clutter returns from vegetation or from the ground which otherwise might prevent the detection by RF or optical sensors of insects and other airborne biota flying in close proximity to the ground. One technique may require that a surface of the ground within side wall boundary zones 15 be level or flat and kept free of vegetation by periodic mowing or grading or by use of chemical herbicides in order to control scattering from the ground surface and reduce clutter returns to the sidewall RF and optical sensors on sensor/weapon poles 6. Alternatively, materials such as asphalt or limestone may be added to a ground surface or mixed with soil in these side wall boundary zones in order to reduce or eliminate possibility of erosion while still providing desired control over RF and optical scattering properties of the ground surface. In other embodiments, the ground may be covered by a material 12 such as metal sheeting or solar panels suspended on or supported by a frame 14 to provide a relatively flat, and more or less horizontal, surface. Desired RF scattering and absorption properties may be incorporated to enhance performance of RF and optical sensors in detecting and classifying small airborne biota targets while protecting soil from erosion and, in some cases, while permitting water drainage beneath the reflective or absorptive surface material and, if solar panels with appropriate properties are used, while generating electrical power as part of the electrical power subsystem 60 for use by sensors of the instant invention or for other purposes. Framing 14 beneath the reflective or absorptive surface material 12 may employ a screen mesh 13 to prevent insects and other biota from entering a field below the controlled scatter surface material 12 and forcing them to fly over the top of the surface where they may be detected by RF and optical sensors 42, 50, respectively. In yet another embodiment, the controlled scatter surface material 12 may be sloped to one side or the other, or installed with a peak or a valley with sides sloped different directions to control directions in which RF and optical energy is scattered and to reduce likelihood that leaves or other materials would accumulate on the controlled scatter surface and thereby alter RF and optical scattering properties or accelerate deterioration of materials comprising the surface by rust or corrosion or other detrimental effect. Where wind loading is a problem for such elevated controlled scattering surfaces, portions of the surface may be installed on hinges 19, perhaps secured by magnetic latches or spring latches or pre-tensioned springs or weights, to permit individual panel sections to swing open once wind loading has exceeded preset limits. This reduces wind loading on the overall structure and reduces likelihood of damage to the structure. Where screen mesh 13 is incorporated into the framework 14 below the controlled scatter surface material 12, portions of the screen mesh 13 or other barrier material could be installed on hinges 19 so that those portions of the barrier could swing out or in to permit drainage of water from or into the field, returning to a closed position after flow of water subsides. Alternately, rubber or other flexible strips 21 can be used to permit flow of water while retarding flight of insects. This reduces likelihood of insects or other undesired biota entering a protected area below the controlled scatter surface. Such hinged sections or strip sections may also be designed to permit entry of desired biota (e.g., foxes which may control rabbits) while reducing likelihood of undesired biota entering thereby. This embodiment also employs backstops 8, 16, 24 in appropriate locations, e.g., at ends of each side boundary zone 15 and suspended along a top of the side boundary zones as indicated in the drawings to provide controlled backgrounds and backstops for sensors and, in those embodiments employing lasers or HPM devices for pest control, laser and HPM weapons. In this instance, the backstops 8,16, 24 provide beam dumps to safely stop laser or HPM energy from the kill laser or HPM device, preventing such laser or HPM energy from leaving the protected regions. Inside boundary zones 15, 17, directed energy is still concentrated so as to possibly cause injury or damage to humans, animals, or other surrounding materials. To enhance safety or provide a capability for detecting airborne biota leaving a monitored or protected volume, additional RF and optical sensor units and controlled scatter surfaces and backstops may be installed on inner portions (relative to the protective volume or assets) of the sidewall boundary zones. These additional RF and optical sensor units may also be installed to operate inside a kill plane 31, if laser or HPM weapons are used, in one embodiment to provide detection of airborne biota leaving the protected volume and to provide enhanced safety for detection of humans or other biota or objects entering or leaving the protected volume, against which kill measures must not be directed. Kill planes 31 generally extend from the objective optics 50 or antenna of directed energy weapons to a beam dump backstop 24, 16 on an opposite side of a boundary zone 15, 17. In the section immediately above, "inside" means from the point of view of the protected region or volume.

Vertical sidewall structures, perhaps similar to fence behind home plate on a little league baseball field, but with solid panels, are installed at the corners of the field to provide sensor backstops 8. These panels may becapable of absorbing radar and ladar energy in selected bands, or in other instances scattering such energy in controlled directions. Smaller panels 24 (generally same height but not as wide) capable of absorbing pulsed laser energy in selected bands may be installed along the corners. These corner "backstop" panels 24 mayhave unique optical signatures, perhaps a grid pattern of miniature corner reflectors or microbeads 12*a* that reflect some ladar energy back toward an illuminating source.

In some embodiments, a screen mesh fence 26 or other type barrier (e.g., concrete block, steel wall, earth berm with suitable cover) may be installed or in an outside (from the perspective of the protected region or volume) portion of one or more of the sidewall boundary zones 15 to force insects and other biota attempting to enter the field, or being blown by wind into the field, to exceed height of the fence or other barrier in order to enter a protected region. Use of such a fence 26 or barrier and resulting elevated height of airborne biota makes it easier for the RF or optical sensors 42, 50, respectively, to detect the insects or other biota without suffering clutter return problems resulting when airborne biota must be detected closer to the ground. Use of such a fence 26 or barrier may reduce or eliminate the requirement to control scattering from a ground surface by one or more of the means described above, or by similar means. For embodiments where such a fence 26 or barrier is used, scattering properties of a top and surfaces of a fence or barrier illuminated by main lobes or side lobes of antenna patterns of RF or optical sensors are controlled to reduce clutter returns for RF and optical sensors being employed to detect airborne insects 3 or other biota in the vicinity of the fence or barrier.

Similarly, a panel 16 of appropriate material, perhaps a fabric or screen backed plastic material, approximately 0.5 meters wide (vertically), more or less, may be suspended on a different set of poles 18 around the field, at a height of about 7 to 10 meters (20 to 30 feet) above a crop 2 or other protected region, this height adjusted based on height of assets and clutter, but also to allow personnel to work within, and farm implements (e.g., tractors, spray equipment, combines) to be used within, the crop field while the sensors and control devices are maintaining the overhead boundary zone. Where it is not necessary for implements or personnel to work within the protected region, the height of the overhead back, and consequently the heights of the overhead boundary zone and the overhead kill plane, could be reduced. This panel 16 is capable of absorbing pulsed laser energy with little or no damage, and has a unique optical signature, created via use of miniature corner reflectors or microbeads 12a, as illustrated in FIGS. 8a and 8b, or by other means of creating a unique reflected pattern. These "overhead backstop" panels 16 may be colored fluorescent orange or some other color readily visible to crop duster pilots, along with any additional supporting poles 18 along the sides of the field 2. Some supporting poles 18 may be installed in a way such that they could be readily, and perhaps automatically, lowered via telescoping or side-leaning action if necessary to permit crop dusting operations over the field (This lowering capability may only be necessary on two opposite sides of most fields, with overhead panels generally parallel to the flight path direction normally used to spray the field when crop dusting or other aerial application is needed.) For many embodiments, especially those protecting generally rectangular fields, backstop panels or barriers for the overhead kill planes may be needed only over two generally opposite sides of the fields, since the sensors and control devices, particularly the kill lasers, can generally be located at the ends of the opposing overhead kill plane backstops lengths and thus have a firing geometry for virtually any point over the field which would be terminated into an overhead kill plane backstop.

This basic concept may be adapted to fields of different shapes by combining straight side segments (i.e., boundary zones 15) in a polygon as needed to surround the field. It may also be adapted to feedlot environments, recreational areas, residential yards, and other volumes containing assets, including people or pets, for which monitoring or protection from airborne biota is desired.

The following section describes an embodiment incorporating airborne biota detection, classification, and pest control (i.e., killing or incapacitation) functions. Embodiments requiring only detection and classification without employing control functions may use a subset of these features. For some applications, for example where a certain type of insect or other airborne biota is dominant, embodiments using only the detection functions without classification functions, or combinations of detection and control functions, without classification, may also be usefully employed. While the embodiment described herein employs pulsed lasers at one or more wave lengths as the kill device, embodiments employing HPM devices 80 (FIG. 2) or robotic aircraft 70 (e.g., miniature Unmanned Air Vehicles—UAVs) capable of flying to prescribed locations using GPS position reference are also possible.

Radar Elements

In one embodiment, radar 42 and other sensor systems, and directed energy (DE) devices (lasers, HPM) capable of killing or disabling insects and other airborne biota, are installed on poles 6, as depicted in the drawings, at opposite ends of each sidewall boundary zone 15. For purposes of this application, the term "pole" is intended to cover any elevated, generally rigid structure upon which the described elements of the system may be mounted, including tripod or other polyleg structures and column or column-like structures. Each pole 6 and associated sensors may be an element on more than one boundary zone 15, 17 and may incorporate sensors and DE kill devices as described elsewhere herein to support operations on one, two, or more sidewall boundary zones 15, and a portion of the overhead boundary zone 17. In general, the sensors and kill lasers on a pole 6 on one end of the sidewall boundary zone 15 are used to provide detection, classification, and killing or incapacitation of selected airborne biota 3 in an opposite half to two-thirds of the same sidewall boundary zone 15 horizontal extent. This reduces angular extent over which the sensors and kill laser systems must operate, reducing requirements for moving parts to steer antennas or main optical objectives. This also accommodates a typical limitation of pulsed radars or pulsed laser or other optical sensor systems, namely, the close-in dead zone which results from a combination of the pulse duration and the need to protect the receiver input stage from the high energy associated with the transmitted pulse, especially when the same antenna or optical path is used for both transmitted and received energy.

Different radar antennas 42 on each pole provide vertical beam patterns 45 along sidewall boundary zones 15 of a field 2 which the pole 6 protects, and horizontal beam patterns 43 over the top of the field 2. In some embodiments, multiple antennas may be used to create different beams in each sidewall or overhead detection zone in order to provide different illumination and detection geometries to support enhanced target detection and clutter rejection algorithms. Individual transmitters may be used for each antenna, or one or more radar transmitters may be switched among multiple antenna elements. Multiple receivers, or a switched single receiver, may also be used, depending upon other requirements and cost tradeoffs. Separate stationary antennas capable of inexpensive mass production may be used where feasible to establish the desired antenna coverage beams. For example, antennas may be stamped from aluminum or consist of plastic injection-molded reflectors coated or flame-sprayed with a metallic coating. This approach reduces operational complexity and enhances reliability of the overall system. Generally, only one stationary antenna is required to establish a beam pattern 45 (on the opposite end) for one-half of a sidewall. However, for some applications and embodiments, it may be desirable to use multiple antennas mounted on a pole, generally at different heights and pointed generally into one sidewall boundary, in order to enhance gain or to provide multiple geometries for illumination and reception, including bi-static or synthetic aperture modes of operation, in order to permit use of enhance algorithms for target detection, clutter rejection, and target characterization. The antennas 42 may contain multiple feeds as needed to support both monopulse tracking and polarization measurement capabilities. In some embodiments, the antennas are capable of supporting multiple radar frequencies over some frequency range, where radar measurements may be made at different frequencies and polarizations to enhance target classification accuracy. The radar antennas 42 are designed with careful attention to sidelobes to reduce sidelobe clutter returns from a crop or other undesired return sources. In general, a main lobe beam of an antenna used for crop protection is only a few meters wide at a range of approximately 1.8 kilometers. The main lobe vertical beamwidth 45 and installation height of the sidewall antennas 42 is designed and controlled so that continuous mainlobe coverage is provided, from ground level (or to the level of the clutter control surface described earlier) to at least the height of the overhead backstop 16, from a point beginning approximately one-third to one-half the distance to an opposite pole 6, and extending to an opposite pole 6. Thus, the combination of sidewall antennas 42 on poles on opposite ends of each side of field 2 provides complete radar coverage for that side of the field. Use of mm-wave radar frequencies, such as 94 GHz, makes it possible to employ antennas designed to these constraints, however, the selection of specific frequencies, ranges, and other specific design parameters is subject to cost tradeoffs, size and radar reflection characteristics of airborne biota to be detected and discriminated or classified, permissible operating frequencies allowed by regulatory agencies (e.g., Federal Communications Commission), permissible exposure levels, and other considerations.

Figure 7:
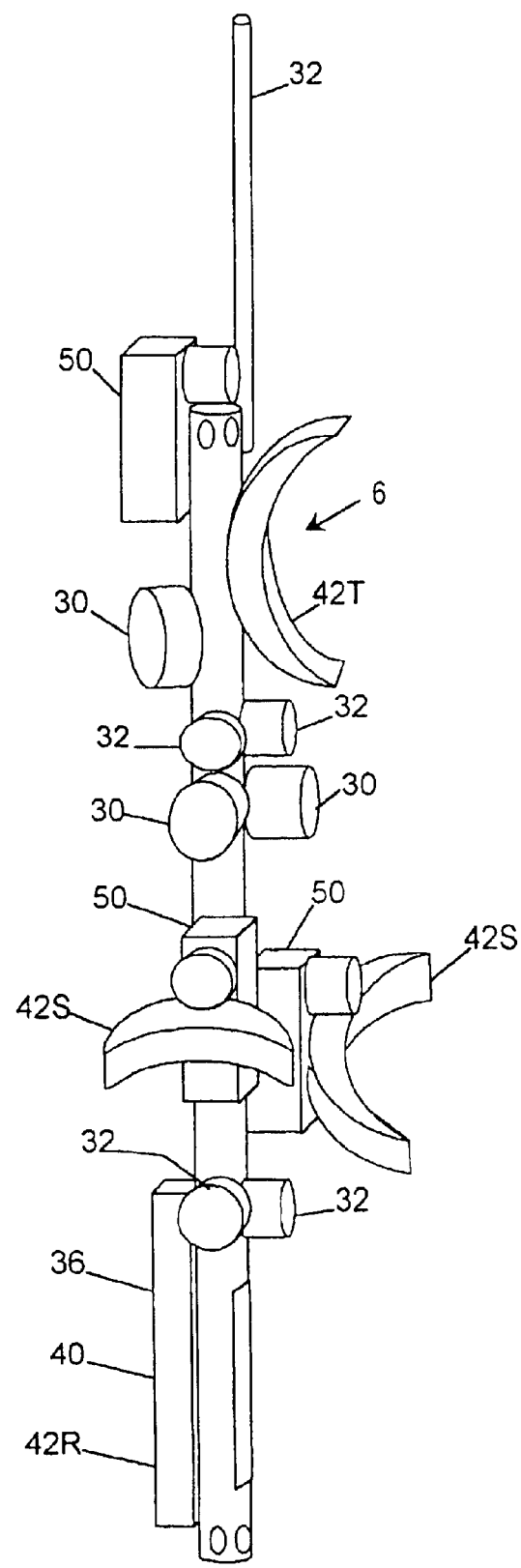
FIG. 7 is a diagrammatic view of a representative embodiment of a sensor/weapon pole of the present invention.
Figure 9:
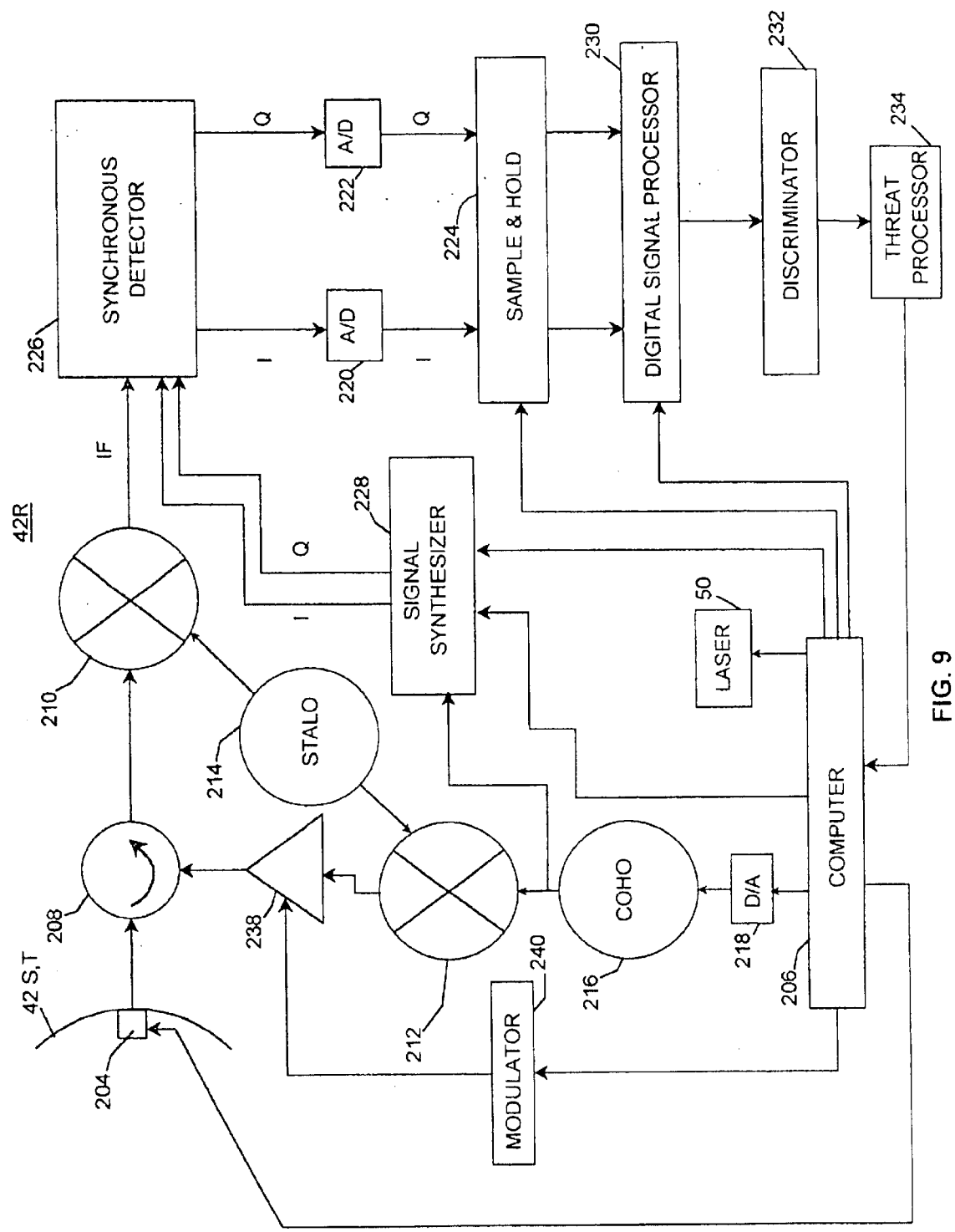
FIG. 9 is a block diagram of one radar subsystem that may be used with the present invention.

Radar coverage across a top of a field may be provided by assembling several mass produced stationary antennas to provide the desired angular and range coverage. Electronic switching of at least the transmitter (or in some embodiments, both transmitter and receiver) between antenna sections may be used to maintain timely coverage over a top of the field. Other alternatives include other types of antennas employing switched beams or phased array antennas. Referring to the block diagram of FIG. 9, the design of antennae 42s, 42t of the instant invention is critical and is highly dependent upon the specific implementation and the application. In the embodiments described herein, and as shown in FIG. 7, one or more antenna types 42t are particularly constructed for use in the overhead boundary zone. One or more antenna types 42s are particularly constructed for use in the sidewall boundary zones. The basic design of the antennae generally involves beam shaping for their particular application. The fundamental approach is to use a fan shaped beam and to modify the beam through beam shaping principles that minimize sidelobes and position sidelobes in such a manner that any adverse effects that could affect overall radar sensitivity are significantly reduced. By using a fan shaped beam, less energy is directed toward the ground and more in an upward direction that reduces clutter effects and multipath. Beam shaping is a common practice among antenna designers and is well known to those skilled in the art. In addition to beam shaping, in some embodiments, the antenna feed 204 referred to herein as feed, is designed to support monopulse transmission, reception, and processing both from an increased resolution standpoint and from a tracking standpoint. Also, in some embodiments, the design of the feed also provides for dual polarization so that polarization information characteristic of the threat can be used as another means of discrimination. The polarization of the transmitted signal is determined by, and is under the control of, the computer 206. Moreover, the design of the monopulse feed 204 is accomplished in such a way that Moving Target Indication (MTI) could be implemented and used as a discriminant. By careful design and construction, sidelobes may be virtually eliminated below the beam and sidelobes may be allowed to be large above the beam. This reduces significantly both clutter effects and multipath. Beam shaping is a common practice among antenna designers. Stock and custom designed antennas and antenna feeds that could be used to support an embodiment of the instant invention are available from several companies who specialize in such work, including, for example, SCIENTIFIC ATLANTA™ in Atlanta, Ga. As previously stated, in some embodiments, the antenna feed 204 designed for monopulse operation and for either dual or circular polarization, is under the control of the computer 206. The antenna feed that is used, whether for dual or circular polarization, is dependent upon the specific implementation and application. The computer 206 generates commands that are directed to the feed to control the type of polarization transmitted and to control the derivation of the orthogonal polarization components of a received signal.

The parts of the radar design that include the circulator 208, the two mixers 210 and 212, the stalo 214, the coho 216, the digital to analog converter (D/A), 218, the two analog to digital converters (A/D) 220 and 222, and the sample and hold device 224, are characteristic of standard radar designs that have been built by such radar houses as Raytheon™ and Lockheed Martin™. The synchronous detector 226, is typical of those that are used in radar designs to generate the in-phase and quadrature components of a received signal. However, in this implementation, the synchronous detector is designed to generate I and Q signals for each polarization component that is detected. The signal synthesizer 228, generates both I and Q reference signals that emulate the signals that are expected from the targets 3. The signal synthesizer 228, is under the control of the computer that determines the type of reference signals to be generated. The computer 206, generates both the commands for generating the reference signals and the timing commands for inputting the reference signals to the synchronous detector 226. The signal from the coho 216, is fed into the signal synthesizer 228 and is modified by the signal synthesizer to provide the reference signals needed by the synchronous detector 226 to form the I and Q signals. While this is standard radar practice, the polarization and radar scattering properties and characteristics of the biota targets 3 determine the exact nature of the reference signal generated by the signal synthesizer 228. These properties are stored in the computer and used to generate the reference signals. In addition, these characteristics and properties are available to the Digital Signal Processor 230, for use in developing the information needed by the discriminator 232, which serves as the final authority in determining whether a detected object is indeed a threat, or possible threat, relative to the protected assets. Once an object has been determined to be a threat or possible threat, the threat processor 234, determines the necessary information needed by the computer 206, to determine the target location so that it can be engaged by the sector laser/optical subsystems 50, which may be operated to help further classify the target as pest or non-pest with higher confidence, and if necessary, disable the insect 3 or other pest.

In many embodiments, a coherent radar is used so that phase information can be preserved. The basic waveform set is specifically designed for the intended implementation and application. However, in most cases a stepped frequency waveform may be used. The transmitter may use a stepped frequency waveform, a common waveform design for high range resolution radar that is needed for many applications and embodiments of the instant invention. This waveform is generated in a computer 206, with the output of the computer 206, used to form a modulated signal in a modulator 240. The signal from the modulator 240, is used to modulate a RF power amplifier 238. The basic waveform is generated at low power and a power amplifier 238 is used to generate the necessary RF power levels needed for transmission. The discriminator 232, possesses the capabilities to determine whether an object is a threat to the assets being protected. It contains digital signal processing techniques based upon the characteristics and properties of the clutter seen by the radar that allow the clutter to be suppressed, if not effectively eliminated. This is done to reduce the probability of incorrect discrimination due to clutter returns and to maintain radar sensitivity with respect to targets that have extremely low radar cross section. Because the radar is stationary, clutter returns in each range bin can be monitored. The received clutter signals can be used to reduce clutter return through the use of techniques such as matched filtering, correlation, signal subtraction, and signal synthesis. Signal synthesis of the clutter signal, both in the frequency and polarization domains can be used in the derivation of synthesized reference signals by the computer 206, to achieve this result. The radar transmitter, receiver, and processor components needed to support a typical embodiment of the instant invention are available from several companies in the U.S. and overseas, including, for example, RAYTHEON™, HUGHES™, NORTHROP™ GRUMMAN™, and others.

Figure 10:
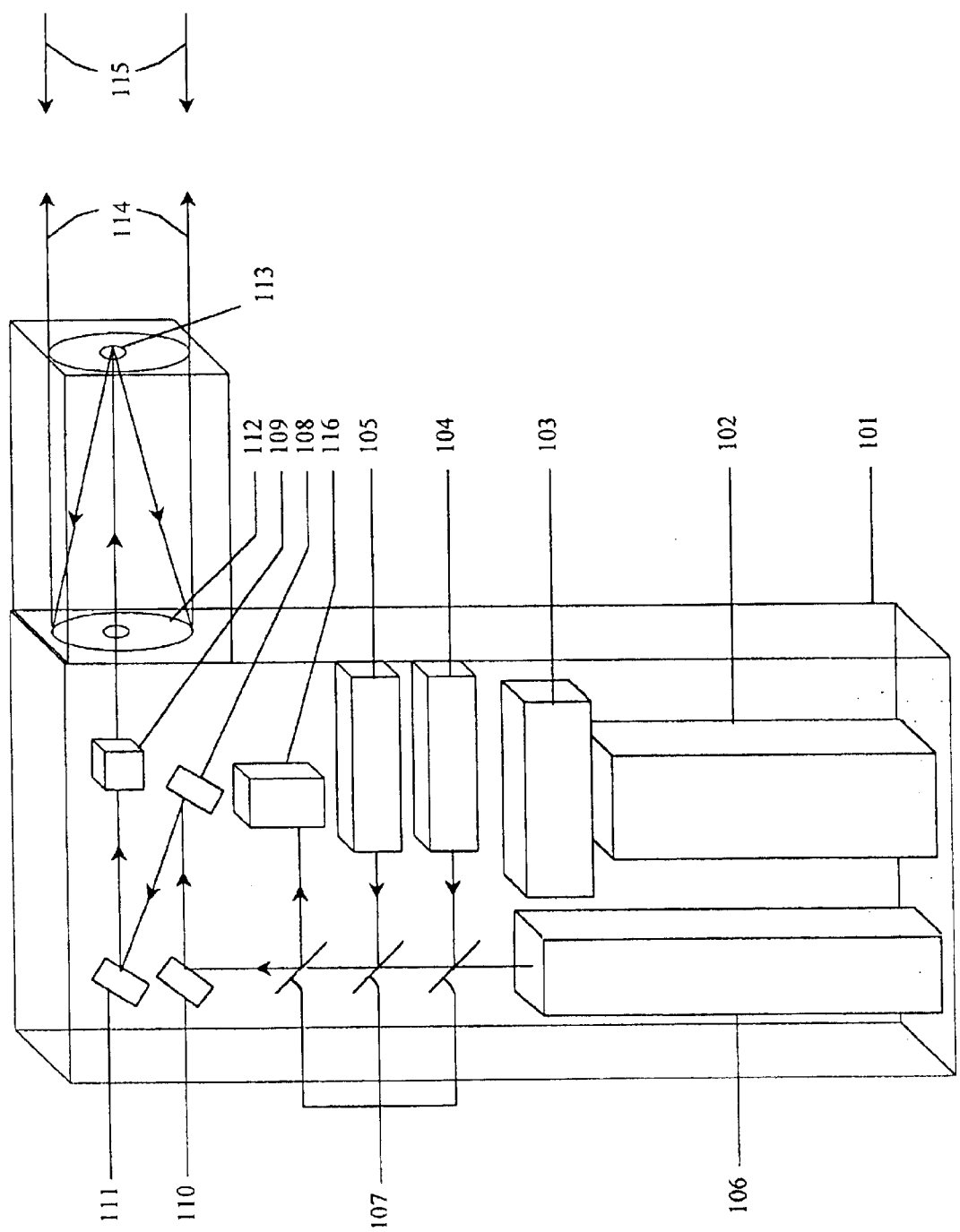
FIG. 10 is a block diagram of one laser/optical subsystem that may be used with the present invention.

In a contemplated embodiment, each pole 6 has three or more sensor and weapon "packages" or instrument groupings 50 containing optical instruments and DE weapon elements, as depicted in the drawings. Each such package may include a radar 42, a laser radar, additional spectral sensors, and a kill laser, as described later herein. Embodiments using a single transmitter or receiver, or a bank of transmitters or receivers, may have none, or only the antenna portions, of a radar, including perhaps pre-amplifiers or downconverters or A/D converters or signal processing components, co-located with the optical instrument package. Where practical and economical, these may all be integrated into one instrument, similar to that shown in FIG. 10 or they may comprise separate instruments or groupings as appropriate. Different instrument "models" or groupings may be needed to provide a top plane coverage as described versus the sidewall coverage because of the differences in angle extent which must be covered. As noted earlier for the radars, in some embodiments, each sidewall optical instrument and kill laser is designed to cover a full vertical extent (clutter control surface to overhead backstop) for the opposite two-thirds to one-half, typically, of the sidewall boundary zone extent. For larger field installations, small angular coverages needed to enforce the opposite half-sidewalls, nominally, (for example, 10 meter deflections at ranges greater than 500 meters) may permit the needed optical instrument and kill laser coverage for the sidewalls to be performed by fine steering mirrors without having to move primary objective optics. This should simplify design and enhance reliability and maintainability of the system. The optical sensor suite may include capabilities to perform differential absorption lidar (DIAL) and laser induced fluorescence measurements in addition to dynamic reflectance measurements and Doppler measurements at different wavelengths. For embodiments used to detect and monitor or control smaller airborne biota, including pollen and fungal spores, the optical instrument group may include instrumentation to permit the use of.

Use of dichroic beam splitters and other techniques permits ladar and other spectral sensors to be combined in the same optical path as a kill laser in some embodiments so that only one set of fine steering mirrors are required. A particular embodiment of optical design depends upon ladar scattering and spectral characteristics of insect and other airborne biota specimens comprising the PBN complex of a geographic region in which a firewall embodiment or other embodiment is employed. (A "firewall" embodiment, so named by the inventors, is an embodiment of the instant invention deployed using lasers as weapons to kill or disable airborne biota identified as pests.) The optical design will also depend upon expected densities of airborne targets and target and pest influx rates (insects per sq meter per second) to be encountered in a deployment region. These parameters govern sensor processor loads and peak firing rates required for an active optical sensor or a kill laser.

As for the radar, determining a preferred embodiment for efficiently and economically providing required coverage for overhead sensing and kill zones requires some tradeoffs between complexities of a single overhead sensing and laser kill instrument vs combinations of instruments assigned different angle coverage segments. Having posed and presented the overall concept for airborne biota monitoring and control, making the engineering tradeoffs needed for optimizing specific embodiments for the different applications shou;1d be within the knowledge base of those skilled in the arts of optical and radar sensor design.

Other Key Features

Figure 14:
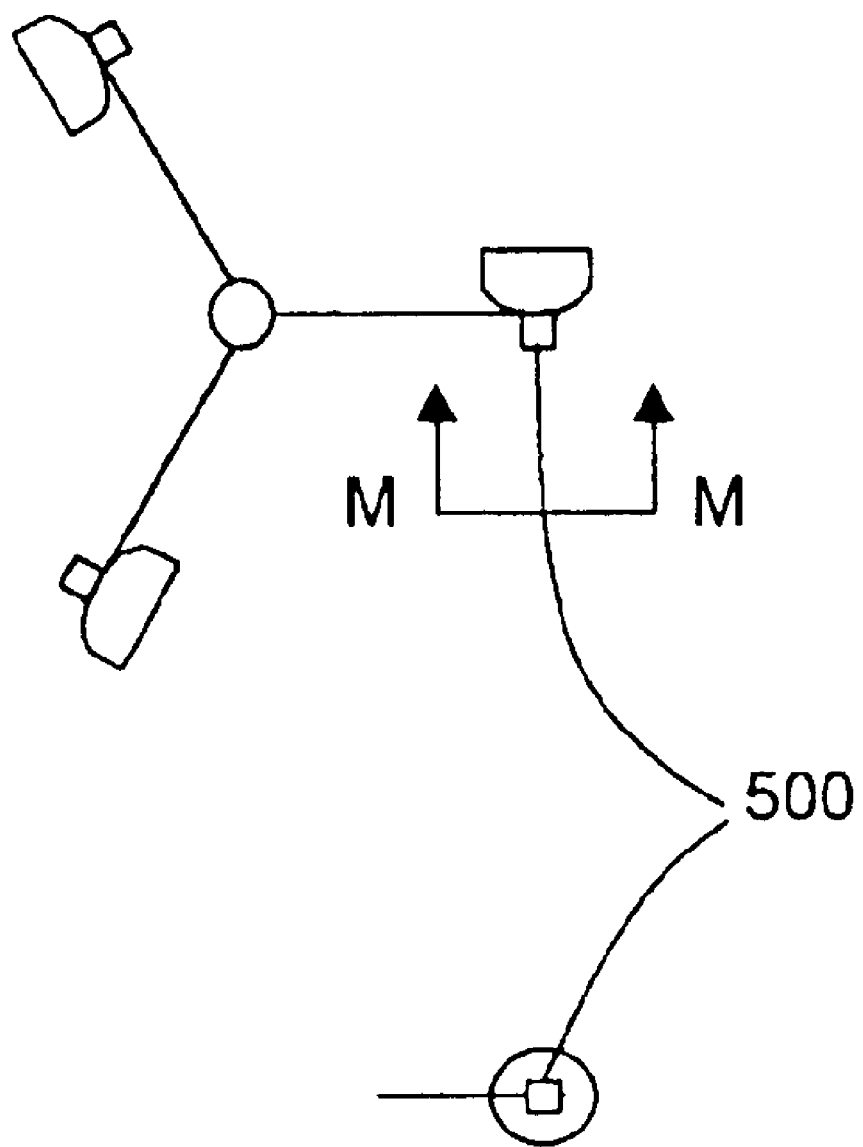
FIG. 14 is a diagrammatic illustration of a passive anemometer that may be used with the instant invention.

Other key features of the instant invention include such features as active or "passive" anemometers and "passive" wind direction gages, temperature and humidity sensors, and other environmental monitors. In this context, a "passive" anemometer, as shown in FIG. 14, is one with special reflectors 500, including retro-flectors such as corner reflectors, that can be directly "read" using Doppler measurement capabilities of radar and ladar sensors. Simple and well known calibration procedures will permit the Doppler shift in the returns detected from these "passive" anemometers to be correlated with the wind speed at the location of the "passive" anemometers. Accurate knowledge of the windspeed, in the near vicinity of airborne insects and other biota detected and tracked by the sensors of the instant invention, can be a useful input to discrimination techniques which make use of the true airspeed of observed insects and other biota. The true airspeed in such cases can be determined by the vector subtraction of the observed vector velocity of an airborne object relative to the ground or other fixed object, including a fixed sensor, from the windspeed at the location of the observed airborne object, a calculation well known to pilots, navigators, and students of vector anlysis. Similarly, "passive" wind gages are designed with wireless telemetry features that permit readout by radar sensors using existing passive readout or other wireless technologies (e.g., RF tag). One technique would be to use a precision rheostat attached directly or via gears to a shaft of a wind-direction arrow, and then use the variable resistance of the rheostat to shift the resonance of an RLC antenna circuit which could be excited via a swept CW pulse, with the resonant reflection detected via a coupled receiver. Circuitry needed to implement this additional functionality is well known to these skilled in the arts of RF sensors, and such circuitry may be readily integrated with the RF and radar sensors of the instant invention. These additional gages in the Weather sensor subsystem 20 (FIG. 2) provide wind speed and direction, temperature, and other environmental parameters to aid in target classification logic. Use of "passive" or wireless readout capabilities permits low cost installation and removal of multiple gages along a side of a field if needed to provide an appropriate resolution of wind gust "fronts" to augment target discrimination. Such sensors and their telemetry capabilities may be operated from batteries recharged by solar cells to reduce installation complexity.

Target Classification Schema Element

The target classification schema is a key element in most embodiments of the present invention. The target classification schema is a primary key automated decision element of the system, and contains and implements methods and procedures whereby detected airborne biota specimens (targets) are classified as being pests, beneficials, or neutrals relative to protected assets in region or volume around which airborne biota are being detected, classified, and in some embodiments, controlled. The target classification schema receives measurement information and specific measured parameters (e.g., radar cross section, wing beat frequency, polarization ratios, etc.) about airborne targets detected by RF and optical sensors employed in the specific embodiment, and uses one or more of various target classification approaches, such as maximum likelihood classifier, neural networks, and others to classify the detected target as pest, beneficial, or neutral. Different target classification schema designed to operate in different modes may be employed, depending upon requirements and constraints associated with specific embodiments of the instant invention for different applications, PBN complexes, and different protected assets. In some applications and embodiments, the schema operates in a mode which attempts to minimize laser sensor energy placed on airborne targets in order to minimize risks of injury or damage to beneficial or neutral biota targets.

In one embodiment, separate instantiations of a target classification schema are used for each half-section, more or less, of the sidewalls, and additional instantiations are used for sections of top or overhead boundary zones and control planes monitored by sensors on each pole or on selected poles.

Concept of Operation

Figure 12:
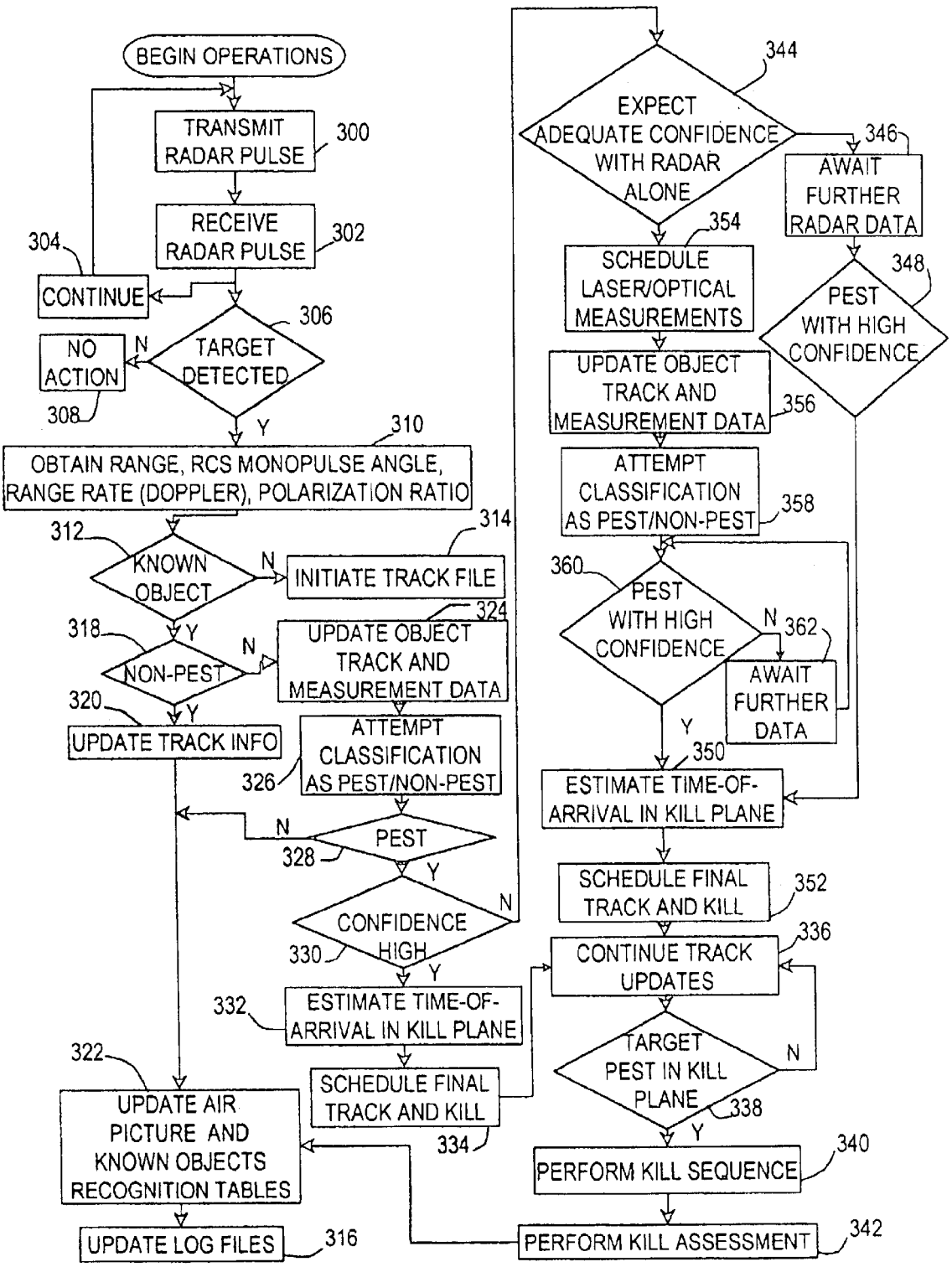
FIG. 12 is a block diagram illustrating representative logic flow of a sector sensor/weapon controller of the present invention.

Referring to FIG. 12, which illustrates logic which might typically be incorporated into a sector sensor/weapon controller 40, as airborne biota 3 (e.g., insects, birds, bats, and occasional leaves and seeds, such as cotton wood or maple seeds) and other objects (e.g., paper and other trash, raindrops, snowflakes) begin to fly or settle into a field, they are initially detected by radar beams 43, 45 resulting from radar transmissions at box 300 from radars 42 surrounding sides and top of a field. Generally falling leaves will not be a problem in crop defense applications since the defense system is generally required to operate only in the spring and summer when a crop is in its vulnerable stages. Typically, a radar of the instant invention used in crop protection applications will continually (box 304) transmit a sequence of pulses of different polarizations into the boundary zones. After one or more of the radar transmissions are received and processed at box 302, a determination is made (box 306) whether one or more objects 3 are in the beam. If no objects are in the beam, no action is required as shown at box 308. Using high precision range capabilities, monopulse angle, RCS, and polarization scattering measurement capabilities of radar 42 at box 310, a check (box 312) is made to determine if a detected object corresponds to a "known object" already being "tracked," or whether a new "track file" at box 314 must be established for a new "target." (Single radar transmitter pulses may provide information on multiple objects in the main beam, using time-delay range gating capabilities inherent in most radar designs, and angle resolution capabilities of radars and antennas equipped with monopulse channels. Single pulses may also provide range-rate, or Doppler information on targets in radars so equipped.) Measurement data such as range, azimuth, elevation, amplitude and Doppler shifts) from a series of additional radar pulses which may be part of an ongoing surveillance sequence as indicated in boxes 300, 302, and 304, or which may be specially scheduled to support "track initiation" will be associated with the "track history" for the same object and used to estimate a "radar cross section" (RCS) of a target, as well as frequency of fluctuations in target amplitude and possibly range rate and other characteristics. Major fluctuations in amplitude generally correspond to "wing-beat frequency" for flying insects and birds and bats (which may be in "coast" mode), but may also be sensed by or caused by changes in orientation of a target with respect to the radar. The combination of peak and average RCS values alone, or in combination with wing beat frequencies, will frequently be sufficient to eliminate birds and bats as targets of further interest as a pest, and measurements by other sensors will not be required on these targets unless desired to support classification and monitoring of the populations of these creatures. Generally, for birds and bats, radar or a central classification processor will simply associate additional observations (which may result from additional surveillance pulses) with the same track file at 320 and 322 until they leave the coverage areas. A log or database entry may be made at box 316 recording their passage if desired. In some embodiments, results of sensor measurements may be transmitted offsite to centralized monitoring locations via wired or wireless communications capabilities 30 of the instant invention. Association and prediction logic, such as a Kalman filter, may be used to help "track" target motion and associate new "returns" with existing track files at box 312. If RCS, wing-beat frequencies, and other data observed by radar are not sufficient to eliminate a target 3 as being a possible pest, then, in the implementation anticipated by FIG. 12, additional measurements are collected to support discrimination. Continuing with box 312 in FIG. 12, if the radar measurement being processed corresponds to a known object for which a track file already exists, a determination is made whether the known object can be classified as a non-pest (e.g., a bird or a falling leaf at box 318. If the target is judged to be a non-pest, the track history is updated with the new measurement data at box 320, and the air picture and known object recognition tables are updated at box 322. An air picture is a continually updated database of objects observed in the boundary zones around the protected region.

Continuing from box 318, if the target of interest has not been classified as a non-pest, then the new measurement data is used to update the established track and measurement data for the target to support discrimination at box 324.

At box 326, using the data from the new measurement, an additional attempt is made at box 326 to classify the target as a pest or non-pest. If the target is found to be a non-pest, the logic falls through to box 322 where the air picture is updated.

If the target in question is not a non-pest at box 328, then an assessment is made at box 330, using known classification techniques, of the confidence that the object is indeed a pest vs a neutral or non-pest.

If the confidence is high based on radar data alone that the target in question is indeed a pest, then an estimate is made at box 332 of the target's time of arrival in a kill plane associated with the boundary zone 15, 17 in which the target is flying.

At box 334, the target is scheduled for final track and kill, after which the logic flows back to box 336 where the track updates on the target are continued until it enters the kill plane region at box 338. After the target identified as a pest with high confidence enters the kill plane, the kill sequence is executed at box 340, and a kill assessment is performed at box 342, after which the air picture is update at box 322, and results are logged at box 316.

Continuing from box 330, if confidence that the target is question is a pest is not high, and it is determined at box 344 that it is likely that radar alone can provide such confidence, then the logic awaits additional radar measurement data at box 346. If additional data establishes confidence at box 348 that the object is a pest, then the target's time of arrival in a kill plane is estimated at box 350 and the target is scheduled for final track and kill at box 352, and the process continues as described.

If it is determined at box 344 that it is unlikely that radar data alone can establish confidence that the object is a pest, then at box 354, laser and optical measurements are scheduled. The algorithms at box 344 might make use, for example, of a database of candidate pests, beneficials, and neutrals which might be active in the geographic region, accounting for season and time of day, in which the embodiment of the instant invention is being used. Some insects and other airborne biota will be similar in radar measurable characteristics to others in the database, making it difficult to classify or discriminate one from another based on radar data alone. In some cases, additional data obtained from radar measurements made at different frequencies may be sufficient to permit classification with higher confidence. In other cases, additional data made with laser or other optical sensors may be needed to increase probability of accurate classification of a target as pest, beneficial, or neutral, or simply pest or non-pest. The object track and measurement data are updated with the results from laser and optical measurements at box 356, then at box 358 an additional attempt is made to classify the object as a pest or non-pest using the additional data.

If it is determined with high confidence at box 360 that the object is a pest, then the object's time of arrival in a kill plane is determined at box 350, and the logic flow proceeds as described above.

If the confidence that the object is a pest is not high at box 360, then at box 362, the processing for this object awaits further data at box 362.

A vector velocity of a target relative to the observing radar may be determined from a history of observations. Local wind speed and direction in a vicinity of a target is determined by using radar and/or ladar returns or wireless transmissions from anemometers and wind direction gages, noted earlier, which are nearest to the target. This permits determination of true air speed of a target which serves as an additional discriminant. Additional requested measurements may include radar pulses or pulse sequences, possibly at different frequencies or with waveforms designed to extract additional information about a target, such as polarization ratios and enhanced micro-Doppler observations. These measurements may be able to resolve additional information about targets in question based upon their geometric shape (long and slender like a crane fly or short and fat like a bumble bee) and electromagnetic scattering characteristics and relative motion of parts of its body, which can be observed with advanced radar technologies as long as there is adequate reflectivity and signal to noise ratio.

Figure 11A:
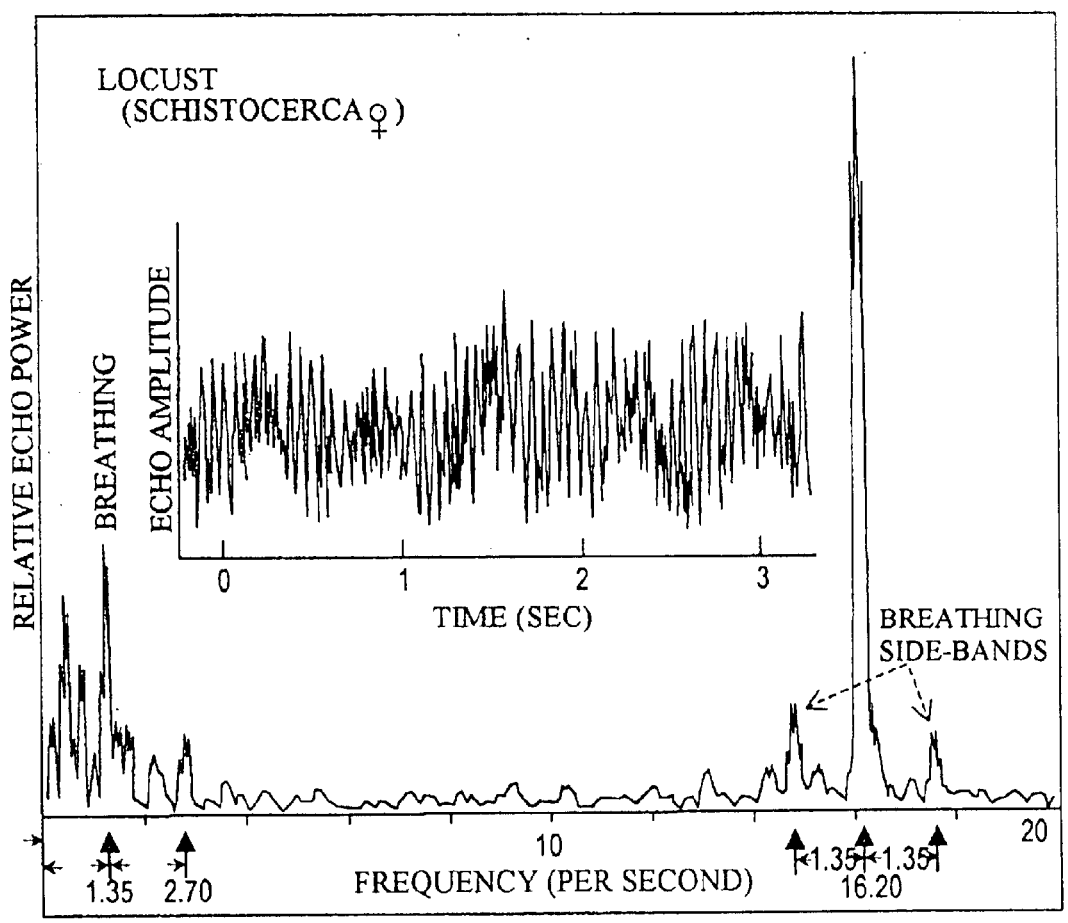
FIGS. 11a and 11b are illustrative of results of radar observations which may be used to classify different insects.
Figure 11B:
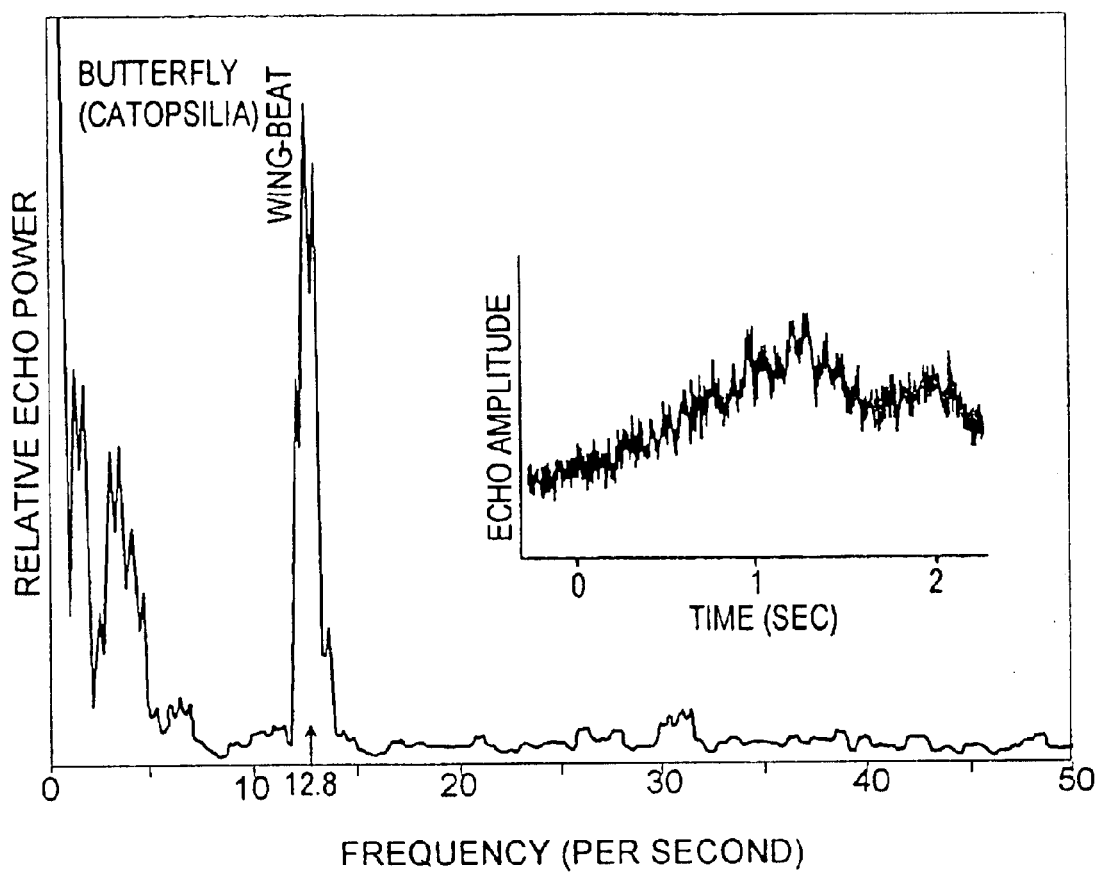

An example of how information about a target can be extracted by a radar and even modest signal processing techniques is shown in FIGS. 11*a*, and 11*b*. This figure is based on radar measurements of different insects (locust and butterfly) made by a much less sophisticated radar than used in advanced embodiments of the instant invention.

In this reference (Schaefer, 1976), and as illustrated in FIGS. 11*a* and 11*b*, Schaefer indicated that, by performing a Fourier transform of time varying amplitude of a series of radar returns from locusts in flight, observed by a modified commercial X-band marine radar, he was able to resolve not only wing beat frequency, but also frequencies associated with insect breathing.

If target information obtained by radar is not sufficient to eliminate inbound target as a possible pest, then additional measurements are scheduled for the optical sensors. These measurements are designed to obtain additional information about a target to support classification as pest or non-pest. The next measurements may be designed to extract spectral information about a target, including differential absorption or reflection of adjacent spectral lines, or use of laser induced fluorescence, or make use of laser radar to obtain more precise information on target micro-Doppler or flight trajectory characteristics. Actual order of optical measurements in embodiments for any particular application will be determined based upon insights gained from prior measurements of target dynamics and spectral and fluorescence characteristics of members of the PBN complex which may be made by individuals skilled in the art of the respective sensor technologies.

Classification strategies that permit adequate classification with minimal use of energy, and with minimal risk of causing injury to targets from use of RF and laser sensors, are preferred. Alternative strategies that may be employed involve making standard sets of measurements on all targets and providing results of these measurements to neural nets or other classification schemes. Detection and classification of airborne targets passing through respective segments of sidewall and overhead boundary zones may be logged to a data file or transmitted to a central monitoring station, or both.

In one embodiment employing control measures, after classification of an object has confirmed to an appropriate confidence level that it is a pest and should be removed from the environment, it will be scheduled as a target for the kill laser, using its current trajectory information to estimate its time of arrival in a kill plane associated with a respective sidewall region. The "kill plane" is a limited sub-zone of the sidewall or overhead boundary zone which is defined by a main optics objective of a kill laser on one end, corner, or side of a sidewall or overhead bondary zone, and a kill laser backstop which includes a generally vertical backstop section at an opposite end of a sidewall boundary section, and a generally horizontal section on an opposite side of an overhead boundary zone. The generally vertical kill laser backstop at an opposite end of a sidewall boundary section is generally adjacent to, and integrated with, the controlled absorption and reflection surface material described earlier. Precise tracking and firing angle is provided by ladar or other optical sensor as a target approaches the kill plane. As a target enters a kill plane, also called fire zone, a pre-pulse of ladar (or kill laser at a very low power setting) is used to confirm, nominally within 10 microseconds to 1 millisecond before a main kill pulse, that the backstop is in place, using the unique optical signature characteristics of the backstop material as described above, perhaps augmented by range gating to provide additional confidence. A charge coupled device (CCD) focal plane or other sensor may be used to confirm that an appropriate pattern is detected on all sides of the target and provide confidence (1) that the backstop is in place, and (2) that no other large object (such as a bird or a human) is in a line of fire for the kill laser. If appropriate safety conditions are not met, the system will recycle on the target until firing criteria are met or until it leaves the kill plane. In alternate embodiments employing multiple apertures, separate pre-pulses may be fired from separate kill laser apertures to determine if an alternate firing geometry exists which satisfies the required safety criteria note above.

When appropriate firing criteria are met, a kill pulse or kill pulse sequence is performed by the kill laser. Depending upon outcome of insect laser susceptibility and lethality studies, different kill pulse levels or sequences may be scheduled depending upon target classification (i.e., type of pest) or aspect angle, if an aspect angle is determined by the sensor suite. Using dynamic data from radar, ladar, or optical sensors, laser kill pulses may also be timed to arrive when pest is in an orientation or configuration, such as a head of the insect facing the laser, or when wings are most nearly perpendicular to the path of the kill laser beam, where greatest damage or disabling injury may be inflicted. Depending upon wavelengths, optics, and beamwidths used by a kill laser, additional insects may be caught in a path of the kill beam and destroyed. It is expected that numbers lost to this effect will be minimal compared to beneficial insects destroyed by other pest control means. However, if this is determined to be a problem, then additional processing may be added in optional embodiments to determine if a firing path is clear of non-pests, or additional kill lasers may be added to the system in slightly different geometries to provide alternate firing paths to provide an enhanced likelihood of obtaining a clear fire path. Additional optional embodiments may employ a summation of energy from multiple sublethal lasers or laser pulses on a target, but this will significantly complicate design and cost of a fielded system.

Use of a backstop confirmation pre-pulse is one of multiple safety interlocks in the system to insure that humans or other higher animal forms are not injured by the system. An embodiment may also employ additional sensors in a safety and security subsystem 32, such as infrared (IR) security sensors, and time lapse photography cameras to provide both safety and security for system assets. Means for automated periodic testing of these safety related sensors and other system performance features may be included to minimize risk of failure of safety features leading to unintended damage or injury. In one embodiment, sensor and weapon poles within a particular field environment are interconnected by a communications subsystem 30 comprising a field local area network (LAN), probably employing one of the RF spread spectrum wireless LAN technologies becoming available, or alternately employing a laser communication system. This LAN may be used in some embodiments to coordinate target information and firing on targets in regions where sensor or weapon coverages overlap if found beneficial in some applications. It also provides a means for collecting information from multiple sensors operating in different sidewall and overhead boundary zone sections on overall insect populations, identified to the extent the system can ultimately provide species classification, should this capability be found attractive for ecological studies and other pest control measures. A field master, and perhaps a backup pole, also uses a longer range communications system (wireless, wire, or fiber optic) which transmits data to regional monitoring centers or to a farmer or other interested parties, depending upon an ultimate operational concept and cost and business decision tradeoffs.

For FireWall sites where normal electrical utility power is available, utility power will normally be used as a primary power source for some sensor weapon poles. One or more backup generators may also be provided for each system, depending upon whether electrical power is conducted along cables integrated with an overhead backstop. Generally, backup generators may be provided for each pole, since such generators are relatively inexpensive (5 kw for $500 at retail). For sites remote from electrical utility distribution systems, solar cells, wind turbines, fuel cells or other power sources may be used in conjunction with alternative energy storage devices (e.g., batteries, capacitors, flywheels, reversible fuel cells) to provide electrical power for operation of sensors and kill systems. Solar cells may provide a dual role as a power source and as a clutter control surface along a bottom of sidewall detection zones. Even in locations where electrical power is available from local power utility distribution systems, one or more sources of backup power employing batteries, generators, or other power sources may be desirable, depending upon the reliability of the utility provided power sources and the criticality or cost of the resources being protected by the instant invention.

In some embodiments, the instant invention may employ pheromone traps equipped with insect entry sensors and wireless telemetry chips in order to monitor presence of pests within protected volumes. Oak Ridge National Laboratory has developed a miniature spread-spectrum wireless telemetry chip approximately 3 mm by 3 mm by 2 mm which may be integrated with a pair of micro-switches in an entryway for a pheromone trap, using power from a small battery kept charged by a small solar cell integrated into a top of a trap, and using an antenna extending down a pole supporting a trap, to achieve adequate range to transmit to receivers located in sensor weapon poles of the instant invention. Identity of a trap from which an insect entry signal is transmitted may be determined by a unique spread-spectrum sequence. In alternate embodiments, the instant invention may also employ laser Doppler vibrometers (LDV) equipped with scanning optical elements to automatically scan vegetation in a crop in order to detect vibrations induced by insect pests within the crop. In such applications, the LDV would be equipped with some combination of servo-steerable optical elements and scanning mirrors to permit a laser beam from an LDV to be scanned across crop plants, dwelling in each sample location for a period sufficient to have a relatively high probability that insects, if present, would perform a vibration inducing activity (e.g., feeding, crawling, signalling) which is detected by the LDV. Automated signal processing is employed to isolate, identify, and recognize vibrations associated with insect and insect pest activity versus vibration signals induced by other sources (rainfall, aircraft flying over, etc.) In many applications, it may be sufficient to employ the LDV sensors only at night when many pests are active and other noise sources may be reduced.

Sector Laser/Optical Subsystem

Part 101 is the environmental enclosure containing the lasers, detectors, computer, optics, and connecting apparatus.

Part 102 is the electrical power supply transformers and power control junctions. Prime electrical power is fed into this supply and the voltage converted to the voltages required by the lasers, sensor, and scanning/steering mirrors.

Part 103 is the computer that controls the sensor laser subsystems 52, the optical sensor subsystems 54, and the kill laser subsystem 56, including steering mirrors, and detector arrays. It performs the function of system monitoring, target acquisition, target discrimination, and fire control.

The computer sends commands to the vertical and horizontal scanning/steering mirrors to scan the field-of-view and point the lasers in the proper elevation and azimuth. The computer simultaneously sends commands to the neodymium: YAG laser to fire laser pulses into the proper sector of the field-of-view. If no backscattered return is detected, the computer instructs the mirrors to shift to the next sector in the field-of-view and the laser to fire a pulse into that sector. This continues until a target enters the field-of-view and is detected by the neodymium: YAG laser pulse. When this occurs, first, the time-of-flight of the laser pulse from the laser to the target is recorded to determine range to the target. Secondly, the computer commands the dye laser to fire a pulse of a pre-selected wavelength at the target to perform the function of discrimination based on the fluorescence of the target or the iridescence of the target. If, based the backscattered return and on a discrimination algorithm, the computer determines the target is friendly, the neodymium: YAG returns to the search mode and continues looking for another target. If the computer determines the target is valid, the computer sends commands to the optical focusing assembly to point and focus the beam on the target, based on the range and pointing data provided by the neodymium: YAG laser and sensor detector array. When the beam is focused on target, the computer commands the neodymium glass laser to fire a high-energy pulse at the target. The amplitude of the backscatter from the target is an indication of whether the target is killed. If the target is sufficiently hit, the system returns to the search mode. If not, additional pulses are fired until the target is sufficiently irradiated.

Part 104 is a dye laser tunable in wavelength from the visible to the infrared such as those sold by LAMBDA PHYSIK, INC.™, SPECTRA-PYSICS LASERS, LTD.™, and others. This laser is used for target discrimination by means of fluorescence and/or iridescence. The laser pulse is tuned to a specific wavelength which will make a certain type of target emit a specific fluorescence characteristic of the target, or will cause the target to show a specific iridescence characteristic of the target.

Part 105 is a neodymium: YAG laser such as those sold by BIG SKY LASER TECHNOLOGIES™, COHERENT LASER GROUP™, or LIGHT SOLUTIONS CORPORATION™, and others, or a neodymium glass laser such as those sold by CONTINUUM™, CUTTING EDGE ELECTRONICS™, KIGRE, INC.™, or QUANTRONIX GMBH™, and others. This laser functions as a target detection, acquisition, and pointing laser. This laser emits a short (5–10 nanosecond) high peak power pulse to detect the presence of a target in the field of fire and determine its position with sufficient accuracy to allow the kill laser to accurately point at and engage the target. It also functions as a laser ranger to determine the distance to the target to allow the kill laser to be properly focused on target. This allows for maximum concentration of laser energy on the target.

Part 106 is a neodymium glass laser such as those sold by CONTINUUM™, CUTTING EDGE ELECTRONICS™, KIGRE, INC.™, and others. This laser emits a high-energy laser pulse (duration approximately 100 microseconds) which, when focused on the target, will kill or cripple the target.

The laser receives high voltage power from the power supply (part 2) is rapidly repetitively pulsed and is able to quickly kill one target after another. The primary energy storage capacitor inside the laser remains fully charged and on stand-by to quickly discharge between pulses. As soon as the laser is fired and the capacitor discharged, the capacitor is immediately recharged by the power supply to allow rapid retargeting for multiple targets.

Part 107 is a series of three beam splitting/combining dichroic mirrors. Two of these mirrors combine the laser output of the dye laser and the neodymium: YAG (parts 4 and 5) laser into the main optical beam train of the neodymium glass laser (part 6). This allows all three lasers to efficiently utilize the same optical beam train and precludes the problem of parallax between the three lasers when focused on the same target. Since all three lasers operate between the visible and near infrared, common optical materials such as glass or quartz are utilized by all three systems.

Part 108 is the horizontal fast scanning/steering mirror such as those sold by GENERAL SCANNING CORPORATIONM. This mirror horizontally scans the field-of-view of the laser system and aims the laser pulses at the target.

Part 109 is a focusing lens assembly, which focuses the neodymium glass laser onto the target. Range (distance from laser system to the target) is determined by the neodymium: YAG laser. This data is then used to adjust the focusing lens assembly with a predetermined focus for the specified range.

Part 110 is a flat turning mirror.

Part 111 is the vertical scanning/steering mirror such as those sold by GENERAL SCANNING CORPORATION™. This mirror vertically scans the field-of-view of the laser system and aims the laser pulses at the target.

Part 112 is the primary optical mirror. This mirror determines the minimum spot size the neodymium glass laser is able to focus to at a specified range.

Part 113 is the secondary optical mirror. This mirror allows a compact optical design with a Cassegrain telescope optical configuration.

Part 114 is the outgoing laser beam pulses. This output consists of pulses from the three laser systems going to the target or targets. All three lasers can be fired individually or synchronously.

Part 115 is the backscattered return/reflection from the target. This data is used to determine the presence of the target, discriminate the type of target, aim the neodymium glass laser to kill the target, and assess whether the target has been killed.

Part 116 is the receiver sensor array. This sensor array detects the backscattered return radiation from the target and processes the data to accurately determine the position of the target and spectrally discriminate the fluorescence or iridescence of the target. Data from this sensor array is then fed to the computer (part 3) and processed by a discrimination and fire control algorithm. The computer then generates commands based on this data whether to fire the neodymium glass laser at the target.

The discussion above describes just one of many potential embodiments of the instant invention. Many other types of lasers or other devices may be employed in any given embodiment as described herein, depending upon various cost and economic tradeoffs.

Laser Weapon Element

Lasers may be an effective and efficient devices for selectively killing insects in the air over very large areas, and may be designed and developed with safety, cost and reliability as a primary criteria. Lasers offer advantages over chemical pesticides in being environmentally safe and highly selective in types of insects it controls when combined with detection and classification capabilities described earlier herein, and since an insect killing mechanism is completely physical, insect population has no opportunity to genetically mutate to become chemically resistant to an insecticide.

Many lasers may easily be adapted to perform the task of killing insects within a boundary zone concept described earlier herein. However, operational and practical constraints quickly lead to the choice of a pulsed gas laser; with additional choices of carbon dioxide or krypton fluoride, as laser systems adequate to perform this task.

A pulsed laser has an advantage over a continuously operating laser for insect control because it requires less laser energy to damage or kill an insect. One means of killing or disabling an insect is achieved by emitting very short (a few hundred nanoseconds to a few microseconds) pulses from a laser and killing an insect with shock impulse and ablation damage of a very short, powerful laser pulse rather than simply heating an insect with a continuous laser beam. A continuous operation laser kills insects simply by heating an insect and would also increase risk of causing fires in field environment. This mode of operation requires much more time (2–4 seconds versus a few microseconds) than a pulsed laser and requires a firing zone to be many meters wide instead of only about one meter or less wide. Since a cross section of an insect is smaller than a cross section of a proposed laser beam, which may typically be from two inches to ten inches in diameter, depending upon wavelength, every time a laser is fired, most laser energy will strike a backstop of the instant invention at an opposite side of a boundary zone.

A carbon dioxide laser may be a good choice of lasers for this task for many reasons. It operates at far infrared wavelengths where a human eye (and most animals) is completely opaque. Carbon dioxide laser radiation wavelengths do not penetrate a human eye and do not present a risk to an inside of an eyeball and retina. A front surface of the human eyeball may be an only vulnerable area and is easily protected with any sort of plastic, whether plastic safety glasses or just a simple piece of clear plastic sheet. Virtually any type of plastic is completely opaque to far infrared carbon dioxide laser radiation. Consequently, inexpensive plastic sheets having other appropriate features (e.g., protection from ultraviolet content of sunlight) may be used as backstop material for the kill laser.

The carbon dioxide laser is one of the most efficient lasers in existence. Most lasers operate with an overall electrical efficiency of less than one percent. Carbon dioxide lasers typically operate at five to ten percent efficiency. This laser is a very common laser and is easy to build. Many thousands of carbon dioxide lasers have been produced commercially and are very popular for many current applications where considerable power is required. This is a very important aspect because cost will ultimately determine effectiveness of this laser insect control system. The $CO_2$ laser itself is environmentally safe to build and to operate when used in the context of the instant invention. A $CO_2$ laser consists of a laser cavity where the laser power is generated and a power supply to feed electrical power into the cavity. Inside a $CO_2$ cavity are three inert gases: carbon dioxide, nitrogen, and helium. On either end of the cavity are mirrors to allow a beam to bounce back and forth to build up power. One of these mirrors allows some energy to escape and produce a laser beam output. Pulsing such a laser is accomplished simply by an electrical power supply sending a short, powerful pulse of electricity to the cavity causing the laser gas to emit its energy in a very short powerful pulse. The single most expensive component of this laser is usually a laser beam output coupling window/mirror. These windows are made from zinc selenide and typically cost $200.00 to $400.00 at retail in quantities of ten. However, cost of these windows when produced in large quantities would reduce cost to less than $100.00 per window.

A carbon dioxide laser operates at a very cost-effective wavelength for this insect control concept. Past experience in building laser systems to directly focus energy on objects over long distances has shown that mirrors and beam director apparatus for aiming a laser beam on a target, can cost approximately twice as much as the laser system itself. This results from requirements to build heavy precision mounts to accurately point a beam. Long wavelengths of carbon dioxide prevent focusing of the beam to a small spot and thus reduces need for precision optics.

Estimated energy per laser pulse for a carbon dioxide laser concept is 10 to 20 joules of energy per pulse. A laser pulse length time would be five to ten microseconds. As an example, at a rate of one laser pulse removing one insect per second, this laser would require 100 to 200 watts of prime electrical power at an overall efficiency of ten percent. These energy levels and power levels are easily attainable from commercial laser products and with proper manufacturing techniques, and as stated, carbon dioxide lasers can be mass-produced at relatively low cost.

Requirement for energy in each laser pulse is determined by how much laser pulse energy is required to kill or disable a tyical insect. Due to extreme thinness of a typical insect's wing (50 to 150 microns), estimated energy required to cause structural damage to a wing sufficient to cripple or kill some insects with impulse shock from the laser pulse is estimated to be 100 to 200 millijoules per square centimeter. A projected cross section of the laser beam as it reaches an insect is ten by ten centimeters, or 100 square centimeters. Ten to twenty joules per laser pulse over an area of 100 square centimeters gives the laser beam an intensity of 100 to 200 millijoules per square centimeter, which should be sufficient to kill or cripple an insect. Actual energy required to kill or disable any particular species of insect or other airborne biota can be readily determined by those skilled in the art by conducting laboratory tests with live specimen and candidate lasers.

Focusing a laser beam on an insect up to one mile away normally requires a separate laser range finder and precision pointing stabilized optics. These two options could significantly increase cost and complexity of a system. To circumvent these issues, a ranging pulse from the RF or laser radar of the instant invention is used to provide range to focus a laser beam optics. For sidewall bondary zones, laser beam director primary optics are generally fixed and rigidly mounted with beam steering and pointing accomplished with a small, lightweight, fast steering mirror mounted in the optics train as indicated on the drawings. This negates arequirement for large, expensive pointing mounts for a primary mirror. Depending on final optics design, a fast steering mirror generally allows a laser beam to be directed over an angle of a few degrees without significant degradation of laser pulse energy. A single laser system with these parameters may cover everything in line-of-sight from approximately one-quarter mile to one mile in range, which is compatible with sidewall boundary zone features of the instant invention. Multiple lasers or moveable optics may be required to cover an overhead kill plane.

For a typical embodiment using a $CO_2$ laser, primary optics may be chosen to have a thirty centimeter diameter, which can be mass produced at a very cost effective rate for the accuracy required by wavelength of the carbon dioxide laser of 10.6 microns. The combination of this wavelength and optics diameter gives their laser beam a divergence of approximately 30 microradians, or a laser beam spot diameter at one mile of approximately ten centimeters. The laser beam leaves a beam director of the invention with a diameter of 30 centimeters and reaches a maximum effective range of approximately one-mile with a focused beam diameter of 10 centimeters. At this maximum range, the laws of physical optics cause the beam to spread out and the beam intensity to rapidly drop to harmless levels even if not terminated in backstops of the instant invention.

Since safety and cost effectiveness are major issues for this concept, it should be noted that this type of laser, beam director, optics and power supply can be optimized to maximize safety to surrounding individuals and minimize final cost per unit system in mass production. All components necessary to use this type laser in the insect control system of the instant invention are available off-the-shelf today. The only requirement is that they be properly integrated into a composite system. Safety, simplicity, and cost effectiveness are been the cornerstones of this entire concept.

A krypton fluoride excimer laser may offer a significant upgrade in overall energy efficiency and reduce collateral damage to other airborne biota by permitting use of a smaller beam diameter. This laser operates at ultraviolet wavelength of 0.248 microns, which is a factor of 40 shorter in wavelength than carbon dioxide wavelength of 10.6 microns. This allows a beam to be focused to one-fortieth a diameter or require optics one-fortieth in diameter, or a practical combination of the two. This wavelength advantage allows more beam energy to be focused directly on an insect and more efficiently utilizes energy output of a laser. More importantly, it allows use of much smaller, and therefore less expensive, optics and beam director mount.

Also, a natural pulse length of an excimer laser is approximately 100 nanoseconds, versus 5 to 10 microseconds for an carbon dioxide laser. This increases shock impulse into an insect and utilizes energy in the pulse more efficiently. Moreover, the short wavelength of the excimer laser is more strongly absorbed by living tissue and further increases coupling efficiency to create damage in airborne biota targets.

A disadvantage of an excimer laser is that it is only approximately one percent efficient, versus 5 to 10 percent for a carbon dioxide laser. However, from overall system efficiency, an excimer laser and suitable optics can deliver more useful lethal energy on target for electrical input energy. There are several candidate laser types and wavelengths which may be integrated and employed within a boundary zone and backstop features of the instant invention. These tradeoffs and design selection and optimization may be made by those skilled in the art of laser system design.

Laser Radar System Concept

In embodiments of the instant invention which are intended to protect primarily against insects, a role of a laser radar is to provide additional measurement data to support classification of objects detected by radar, and to provide precise pointing information for a kill laser. In typical insect control embodiments of the instant invention, data from RF radar will provide location and direction to airborne targets requiring further classification data and possible targeting for a kill laser. This location and direction data is provided to a hybrid ladar and optical sensor components of the instant invention with a request for additional measurements and more precise tracking and pointing information to aim the kill laser if required. One approach to obtain more precise tracking is to use a laser coupled to an optical detector array. A carbon dioxide laser could easily be used both for detecting, tracking, aiming, and killing insects. However, since cost is always a primary consideration, optical detector arrays, which are sensitive to carbon dioxide laser wavelengths required for this system, are prohibitively expensive and constantly need to be thermally cooled.

With an excimer laser concept, in order to obtain spectral measurements to support target classification, an excimer laser could be used to pump a tunable dye laser, which may be tuned with a programmable grating to lase at one of several predetermined wavelengths. Dichroic beam splitters and filters may be used to permit multiple sensors and wavelengths to use the same optics path, as indicated in the drawings, or separate instruments may be used. This multispectral approach permits target reflectivity and flourescence to be examined at multiple wavelengths, thereby greatly enhancing system discrimination and classification capabilities.

Inexpensive optical detector arrays are easily available at near infrared wavelengths. Sensitivity of these arrays extends into the eye safe wavelength region just beyond 1.5 microns. High power, short pulse lasers such as erbium:YAG lasers are now available in this wavelength region. A low energy (less than one joule per pulse) erbium:YAG tracking laser may be used to detect insects at ranges up to one mile, and information therefrom used to direct a larger kill laser (e.g., $CO_2$, eximer) to kill them. One concept for hybrid sensor and kill laser instrument employs multiple lasers sharing a same optical aperture to reduce costs and remove parallax between a carbon dioxide laser beam and the erbium:YAG tracking laser beam.

Optics for a tracking laser beam may be configured so that a single detector pixel of an optical detector array would precisely cover a cross sectional area of a carbon dioxide laser beam (0.1 by 0.1 meters) or an excimer laser beam at its maximum effective range of one mile. Fora $CO_2$ laser this would allow a 256 by 256 detector array, with a single pulse of a sensor laser, to cover a maximum area of 25.6 meters wide and 25.6 meters high at a maximum effective range of the carbon dioxide laser. At excimer wavelength, a laser beam cross sectional area at a focal point would only be 0.01 by 0.01 meter (one square centimeter) at all ranges out to maximum range.

Atracking laser would send out a laser pulse in a general direction of an insect and a specific pixel in an associated optical detector array would see a return reflection. Since the tracking laser and kill laser share the same aperture, a fine steering mirror used to direct both would make a small final adjustment to point the kill laser energy in a precise direction from which a return reflection from an insect came. The kill laser would be fired, the insect killed, or disabled, and the system would move to another target.

There may be occasions where multiple insect pests appear in a field-of-view of a tracking laser simultaneously. In this event, a computer microprocessor controlled laser tracker simply would follow priorties established by a central classification logic unit, based primarily upon time of arrival in a kill plane, to select one insect at a time to fire upon and continue to do so until all insects in the field-of-view had been removed.

A problem of pointing a kill laser in a direction of an insect is greatly reduced by matching a beam spread of the kill laser to angular resolution of a single pixel in an optical detector array. In embodiments employing a $CO_2$ kill laser, a tracking laser is capable of resolving position of an insect to a small fraction of laser beam diameter at maximum range due to its shorter wavelength. However, to do so would not improve performance of a carbon dioxide laser since that laser will kill an insect equally well anywhere in its beam. Also, to focus a carbon dioxide laser beam to a smaller spot size at maximum range would require larger optics and a much heavier mirror mount and beam director system, which would greatly increase overall cost of a system.

An excimer laser system will require more precise optics than a carbon dioxide system. However, since optics of the eximer laser system will be only one-third to one-fQurth the size, overall costs will be significantly less.

In some embodiments, solar panels provide prime electrical power to sensors and kill lasers when other electrical power sources are not cost effective. Storage batteries could provide power during nighttime operation and charge during daytime. A gasoline or diesel powered portable electric generator could be used to provide power at times of high insect migration. Such a system requires relatively little power to maintain operation at times when insects are not flying into a field. Only when large numbers of insects are flying into a field or other protected area simultaneously would a laser system require significant power from a solar arrays, batteries, or other sources.

The overall system may be programmed to operate completely autonomously and may be wired to transmit a signal back to a base control monitoring station if some problem should arise. Or, the system could effectively monitor presence and flight paths of insects and periodically report this data back to a central monitoring station to provide information on insect populations, migration or flight patterns.

Laser Doppler Vibrometer

A laser Doppler vibrometer (LDV) 58 is a laser device capable of detecting extremely minute vibrations such as those an insect makes while feeding on a plant. In principle, it is similar to police radar used to catch speeders. Here, police radar sends out a microwave signal which bounces off a moving car and is reflected back to a receiver where the original radar frequency is mixed with a reflected signal and a doppler velocity difference frequency detected. Motion of a car to a police radar detector is analogous to motion of plant vibrations to a LDV. With a LDV f, a carrier frequency is approximately 10,000 higher andcapable of detecting typical plant vibration amplitudes on the order of one nanometer (one billionth of a meter).

Principle of operation for a LDV is simple. Light from a laser such as a helium-neon laser or semiconductor diode laser (operating at 0.6 to 0.7 microns) is separated into two beams with one beam shifted in frequency by approximately 30 megahertz by a microwave-driven Bragg grating cell. The original signal is immediately directed to a PIN photodiode detector, while the shifted beam is directed toward a target. Doppler shifted reflections from the target are received back at the photodiode detector and mixed with the unshifted signal. Since a maximum response frequency of the photodiode is on the order of 100 megahertz, the detector only responds to a Doppler shifted portion of the 30 megahertz signal mixed with the original signal.

This Doppler shifted 30 megahertz signal is again mixed with the original 30 megahertz signal to separate out plant Doppler vibrational frequency, typically a few tens of Herz up to of a few hundred Hertz. This signal then passes through an analog-to-digital converter and is digitally processed to determine characteristics and nature of plant vibrations.

Since plant vibrations from insects have such a small amplitude and have similar frequency components to plant vibrations resulting from ambient noises in a field (wind, tree frogs, over-flying aircraft, etc.), advanced signal processing algorithms, including some techniques from chaos theory, may be required to separate out insect vibrations from ambient noise induced vibrations. Digital signal processing (DSP) integrated circuits may be incorporated into LDV electronic circuits to digitally filter out background noises and identify characteristic vibrations produced in plants by insects. This technology is commonly used in many devices today (i.e. cars, machinery, radar detectors, etc.) and can be implemented at low cost. Digital LDVs which can support various embodiments of the instant invention are now available from several commercial sources. The flowchart, by way of example, provides an overview of key sensor, classification, and control components of the instant invention in a typical embodiment. As noted earlier, some embodiments may provide only detection and classification of airborne biota as pest, beneficial, or neutral, or simply as pest or non-pest. Other embodiments providing airborne biota control functions may include additional features of the instant invention to permit timely killing or incapacitation of airborne biota, depending upon classification outcome, with directed energy weapons (e.g., laser, HPM) or remotely controlled robotic aircraft.

Different embodiments of the instant invention may employ some or all sensor technologies portrayed in the flowchart. Principal purposes of various combinations of RF and optical sensors which may be employed in the instant invention are to provide measurement data to support detection, tracking, and classification of airborne biota targets traversing one or more sidewall or overhead boundary zones adjacent to or surrounding the region or volume for which airborne biota are being monitored or controlled or both. Active sensors, in context of the instant invention, include those sensors which transmit energy (e.g., RF energy for radars, laser energy for ladars and for certain laser fluorescence and spectroscopy measurements) and then observe energy scattered or transiently emitted (e.g., as in laser fluorescence) toward receivers or detectors and their associated energy collection devices (e.g., antennas for RF elements, objective optics or mirrors for optical sensors). Passive sensors include sensors for detecting energy emitted from airborne biota targets in various regions of the electromagnetic spectrum, including RF and optical wavelengths, and include such sensors as microwave radiometers and infrared sensors. Selection and use, in portions of backstops and in portions of controlled scatter surfaces described earlier herein, of certain materials having desired absorption, emission, or scattering properties, or mixtures of such properties, for electromagnetic energy at various wavelengths of interest, can provide enhanced performance for active and passive sensors by reducing undesired backscatter and, in some embodiments, by also reducing noise backgrounds. Reduction of noise backgrounds can also be enhanced in some embodiments by active cooling of material in the backstops by shading of the backstop material from sunlight or by use of cooling water or active refrigeration or some combination thereof.

In a typical embodiment providing detection, classification, and control functions, sensor and weapon elements located on one sensor/weapon pole provide detection, classification, and control functions for opposite ends of two sidewall boundary zones and a portion of an overhead boundary zone. In some embodiments, sensor and weapon elements may provide detection, classification, and control functions for only one sidewall boundary zone, and in other embodiments, a single sensor/weapon pole may provide control functions for more than two sidewall boundary zones.

Generally, sensor and weapon elements and associated processing, safety, and control functions on each sensor/weapon pole will operate more or less autonomously from sensor and weapon elements on other sensor/weapon poles to provide detection, classification, and control of airborne biota crossing through portions of sidewall boundary zones or overhead boundary zones for which it is responsible. In some embodiments, it may be necessary to use slightly different RF frequencies on different sensor/weapon poles in order to avoid RF interference between different RF sensors. Alternately, or in addition, interference among different RF and optical sensors may be avoided by use of a time-slot system wherein different sensors operating within a same region are assigned different time slots for use of certain RF frequencies or optical wavelengths. As another alternative, use of certain frequencies and wavelengths may be coordinated among multiple sensor units by use of a token, as used in some network communications protocols, or other similar known techniques.

In some embodiments, results of measurements from various RF and optical sensors on one pole covering a portion of a sidewall boundary zone or an overhead boundary zone are provided to a target tracking and classification function also associated with the same portion of a sidewall or overhead boundary zone. In many embodiments, initial detection of a given target will be provided by a radar unit.

Radar measurements include the range, azimuth, and elevation, and consequently, position or spatial measurement, to some accuracy determined by range cell dimension and angular resolution of the radar. Using primarily spatial data, a check is made by a tracking and classification unit to determine if a measurement should be associated with an existing track file or whether the measurement represents a new detection of a new object. Spatial data generally provides basis for associated different measurements from different sensors with the same object in order to support target classification. Depending upon which of several discrimination schema is being employed for a particular application of a particular embodiment, additional measurements are made with various sensors to provide data needed to support adequate classification for a particular application. Parameters from additional measurements are associated with a track file, and these associated measurements provided to a classifier for a classification decision. The classifier may implement any of several multi-variarate classification schemes, such as maximum likelihood, or the classifier may employ neural network techniques, or a simple decision tree. Classification decision will generally be based upon a priori measurements of various known PBN specimens made with similar sensors as those employed in various embodiments of the instant invention. Such measurements can be readily made by those skilled in the art of the various sensor technologies employed in particular embodiments.

In some embodiments, higher level (e.g., field-level) control and coordination functions may be provided by a system controller 36 (FIG. 2) and a backup system controller 38 to not only avoid interference, as noted above, but to also provide more optimal use of resources (e.g., during periods where pest influx rates exceed weapon capacity in a normally assigned region) or to enhance classification performance. For example, where coverage areas overlap between different sensor/weapon poles (e.g., in middle of sidewall boundary zones or in certain areas of overhead boundary zones, track files or kill assignents or both may be coordinated among multiple sensor/weapon poles in order to better handle higher sensor and weapon task loads associated with periods of higher biota activity (e.g., during a migratory influx of moths). Using this higher level coordination between sensor/weapon poles permits, for example, a weapon on one pole to fire on a target within an overlap region when a weapon which would normally fire on the target is busy with other targets in its principal regions of responsibility, or not functioning for other reasons. In some cases, target classification may be enhanced by using alternate viewing angles which may be provided by sensors on other sensor/weapon poles of the instant invention. Higher level coordination between target classification units on multiple poles may be used to "share" data and arrive at more accurate classifications of airborne biota targets. Where such features are desirable in particular embodiments of the instant invention, sensors and weapon elements may be designed to provide coverage over a greater portion of a sidewall boundary zone of an overhead boundary zones to provide additional overlap with other coverage areas of sensors on other sensor/weapon poles in order to provide greater flexibility in managing higher target influx rates and to obtain additional viewing angles on more targets to enhance classification performance.

In a typical operational mode for a typical embodiment providing airborne biota detection, classification, and control functions, RF sensors will provide initial target detection and classification function. Typically, radar units generally operating at frequencies of a few GHz or higher are used to provide this function for embodiments intended to provide detection, classification, and control of insect pests and larger biota. As stated, it is clear from available literature that even modest radars operating at X-band and above are capable of detecting most moths and many other pests of interest for most crops, as long as these insects are in-flight well above the ground or vegetation so that backscattered clutter and other RF noise sources are not significant. Use of backscatter control surfaces and materials (including radar and laser absorbent materials) of the instant invention, and use of antenna designs which reduce sidelobes in terms of gain or angular extent or both will provide enhanced signal-to-noise-plus-clutter to enable radars to detect targets near a ground surface within sidewall boundary zones.

In some embodiments, higher frequency radars, such as W-band radars at approximately 94 GHz may be used to permit use of smaller antennas to achieve the same main lobe gain and to permit design of antennas with principal sidelobes having reduced gain or reduced angular extent or both to minimize likelihood of undesired backscatter from vegetation, the ground, or other items in a vicinity of operation of these embodiments. For some applications and airborne biota of interest, passive RF sensors (e.g., microwave radiometers) may be sensitive enough to provide initial target detection, followed by use of radar and ladar sensors, and permit system operation with less power.

Other embodiments related to other applications may be able to use highly sensitive receivers to detect ambient RF energy from other sources, such as AM or FM radio stations, scattered from targets in order to provide a capability for initial target detection with minimal use of power. By using time of arrival of a directly detected ambient RF signal at one or more poles with time delay and angle or arrival of an offset replica of the signal scattered from airborne targets (which offset delay can be determined by performing correlation processing of samples of a directly arriving signal with a scattered replica signal received by high gain antennas covering boundary zone areas), it is possible to perform initial target detection and tracking of airborne targets reflective enough to provide a detectable level of scattered signal.

Antennas associated with RF sensors may be designed to provide beams shaped so as to provide main beams with a high gain for airborne biota targets in sidewall or overhead boundary zones while minimizing gains associated with antenna sidelobes which may illuminate potential sources of undesired backscattered return. Generally, antenna mail lobe beams used in sidewall boundary zones are expected to be more or less elliptical in cross section so as to provide a more or less vertical fan-shaped beam. A center of this beam will generally be aimed at a base of a pole on an opposite end of a sidewall boundary zone. In some applications, where length of a side of a protected area exceeds an effective range of sensors or weapons available to support the embodiment of the instant invention, additional sensor/ weapon poles may be added along a side of a protected area, with their sensors and weapon elements oriented to support end-to-end adjacent sections of sidewall boundary zones.

In embodiments where one application includes detection of very small insects and smaller biota (e.g., fungal spores), RF sensors may be augmented or replaced by ladar sensors and other optical sensors in order to provide initial detection, tracking, and classification of the smaller biota specimens. In addition to making optical cross section and polarization measurements of airborne biota targets, and measurements of temporal variation of such properties, optical sensors are designed to provide range gated measurements and, in some embodiments, to be able to integrate multiple measurements, as in a pulse train, in a least a non-coherent manner, in order to provide enhanced detection performance for smaller biota specimens and to provide enhanced performance where atmospheric scintillation exists. In other embodiments, where more sophisticated target classification capabilities are required, optical sensors capable of performing coherent integration of a series of laser pulses may be employed to enhance detection thresholds and to measure other properties of airborne biota targets. In other embodiments, tunable die lasers or optical parametric amplifiers may be employed along with appropriate detectors to permit measurements of backscatter or forward scatter from airborne biota targets at one or more specific wavelengths to permit measurement of some spectral reflectance properties of airborne biota targets. In yet other embodiments, tunable lasers or optical parametric amplifiers may be used along with dichroic filters (e.g., as in laser induced fluorescence spectroscopy) to induce and measure fluorescence properties of airborne biota targets. (These enhanced optical measurement capabilities may also be employed in some embodiments to enhance target classification capabilities for other larger insects and other larger airborne biota targets.)

Active optical sensor elements may employ range gating techniques to aid in target location as well as to distinguish energy scattered from one or more airborne biota specimens from energy scattered from other airborne biota specimens displaced in distance along a path of a transmitted optical beam (e.g., laser beam or collimated white or filtered light). Optical sensor elements may support measurement of spatial position of detected airborne biota targets by using a combination of range measurements and angle measurements.

Active RF (e.g., radar) and optical sensors (e.g., ladar) may support measurements of spatial location of targets by a combination of range measurements and angle measurements. Range measurements may be based on range gating techniques common in modern conventional or Doppler radars. Range measurements may also be made based upon transmission and reception of pseudo-noise encoded pulse trains or other available techniques.

Key Points

Biota detection volumes are established around the sides and top of the crop or other region to be protected, using radar or laser sensors, or some combination thereof,

- to detect airborne biota entering or leaving the region being monitored, and
- by observing and measuring its position, flight (or drift) characteristics and certain other characteristics (e.g., wingbeat frequency, length to width ratios, different reflection characteristics at different frequencies or wavelengths), and
- by combining results of those measurements in an appropriate automated classification (or discrimination) schema (including, for example, a [trained] neural network),
- determining whether the detected biota is one which should be controlled (e.g., an insect pest) or one which should be allowed to pass freely into or out of the monitored region, and
- having determined that a given biota is one which should be controlled (e.g., killed or incapacitated to reduce its ability to cause harm), use a laser beam or other precision means (e.g., radio controlled model aircraft), in conjunction with appropriate safety measures, to kill or incapacitate biota selected to be controlled.

THE SAFETY MEASURES INCLUDE—the use of additional infrared sensors and other sensors, as well as the radar and laser sensors, to detect humans or other protected animals or assets entering the potential laser line of fire (or regions where radio controlled aircraft are operating or other precision control measures capable of causing injury to humans or other mammals are being employed) and

- the use of backstops to prevent the laser energy from leaving selected boundaries around the controlled regions where it might otherwise cause harm or undesirable effects.

Another aspect of the method involves the removal or control of vegetation, or the use of special ground covers and background control panels (e.g., radar absorbent materials or materials with useful radar scattering properties and geometries), in selected areas, to eliminate or reduce sources of clutter and scattered signals which may interfere with the ability of radar or ladar sensors to detect the airborne biota within the detection regions and make the measurements needed to support classification of the detected biota as biota which should be controlled or permitted to pass freely.

Another aspect of the method involves the use of barriers (e.g., short screen fences to establish a minimum altitude for biota entering or exiting the controlled area to enhance the likelihood that the sensors will detect the biota and to also enhance safety and effectiveness of the measures used to control the biota selected for control.

Another aspect of the method involves the use of devices with known reflection and other physical characteristics to monitor the output from the laser or radar sensor and to permit the use of special processing techniques which can help eliminate undesirable effects of the radar or ladar sensor instabilities (e.g., frequency drift, pulse to pulse power variations) to enhance its ability to detect the biota and measure characteristics of the biota.

Another aspect of the method involves the use of additional sensors capable of determining the local wind speeds or velocities, solar radiance, and other aspects of the local environment which may influence the selection of sensor operating points (e.g., Doppler bin settings in a radar signal processor) or the implementation of the classification or discrimination approach (e.g., shifting a discriminant based on apparent flight velocity to account for effects of wind).

Another optional aspect of the method involves the use of the same radar or laser sensors in a different mode, or different radar or laser sensors, to monitor for evidence of the presence of selected biota within the monitored region (e.g., detection of vibrations in crop plants caused by insect activity such as chewing, crawling, or thumping), or to monitor for presence of gasses associated with the health and status of the crop (e.g., cotton under stress from insect damage or other sources emits ethylene gas and other volatile chemicals, which can be detected by use of differential absorption lidar, Raman scattering, and other measures).

Another aspect of the method involves the use of laser to monitor for chemical changes induced in "witness disks" placed within the field or along the border, wherein the witness disks have the property that their reflection characteristics are changed by interactions with certain gases related to the health and status of the crop.

Another aspect of the invention involves the use of a different type of "witness disk" which has a known vibration response vs acoustic sound intensity which can serve as a "standard" to define sound intensity levels within the crop from such sources as aircraft flying overhead and permit the use of laser doppler vibrometry to measure the simultaneous response of crop plants in a known sound intensity level to determine whether the plants have appropriate turgor or whether they are in a wilt or stress status.

Another aspect of the method involves the use of insect traps employing pheromones or other baits to selectively attract insects wherein such traps are instrumented with miniature contact wires or vibration sensors with wireless telemetry transmitters which can monitor for circuit breakage or vibration thresholds and transmit an alert when an insect enters the trap.

Although the use of integrated radar and laser/optical sensor/weapon packages, such as illustrated in FIG. 7, may be desirable for many embodiments of the instant invention, it is to be understood that many alternate implementations are also practical in alternate embodiments. For example, radar subsystems 42 in some embodiments may be designed to operate in a portion of a boundary zone closer to a sensor-weapon pole 6 supporting a particular radar antenna, so as to minimize the range-to-the-fourth-power losses applicable to most radars. In such embodiments, the position of objects observed by such a radar sensor would be translated via various coordinate transformations in radar subsystems 42, sector sensor/weapon controllers 40, system controller 36, or elsewhere within system algorithms, to provide a relative position which could be used by a sector laser/optical subsystem 50 to direct a laser/optical sensor or a kill laser in the direction of a given target.

Figure 15:
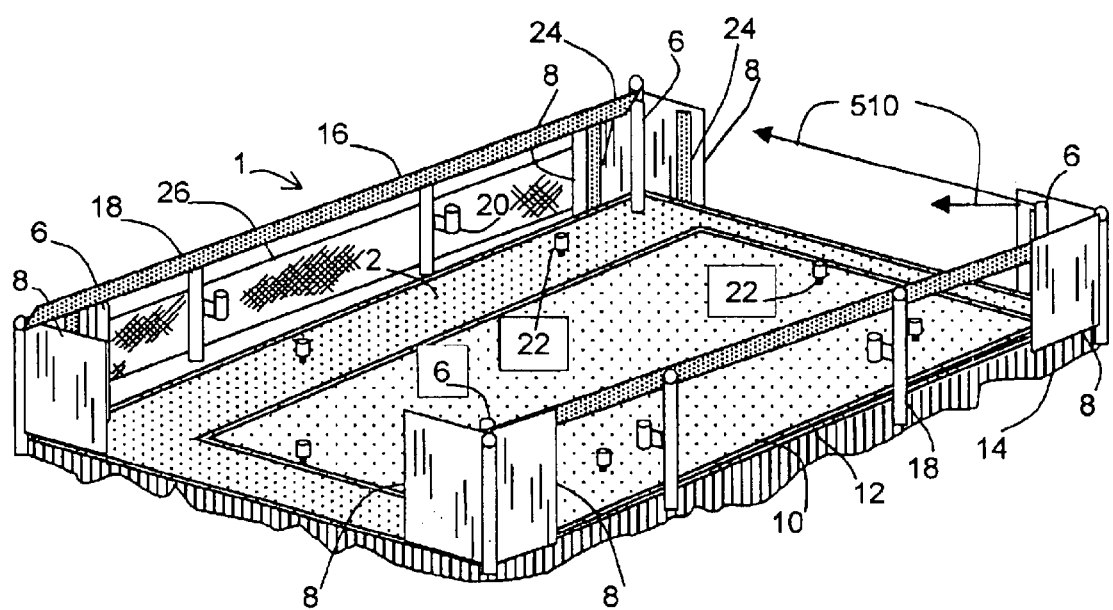
FIG. 15 is a diagrammatic illustration of an alternate embodiment of our invention showing open ends.

Some embodiments of the instant invention described heretofore in this application have included use of overhead kill plane backstops 16 to reduce risks to people, non-targeted biota, and other resources external to the region being protected and to enhance the overall safety for practice of the instant invention. However, various alternate embodiments may also be practiced, depending upon the particular needs, limitations, or other characteristics of the operational environment within which the instant invention is to be implemented. For example, in embodiments protecting crops for which aerial application (e.g., by cropduster-type aircraft) of other chemicals (e.g., herbicides, defoliants, fertilizers) in addition to insecticides is required, the overhead kill plane backstops can be omitted from opposite ends of a generally rectangular field, as illustrated in FIG. 15, to eliminate the overhead kill plane backstop 16 and support poles 18 as a potential hazard to aircraft used for aerial chemical application. The sensor-weapon pole 6 configurations can be arranged in such embodiments to provide essentially complete coverage and implementation of an overhead kill plane by operating in the manner described earlier between opposing sides which still provide overhead kill plane backstops 16. Such embodiments may still make use of the laser absorption, scattering, and unique optical (or alternately, radar) signature of the overhead kill plane backstop 16 material to implement the interrogation pre-pulse as described earlier to insure the backstop is in place, and to help insure that no objects (human arms, eyes, other susceptible and valuable items) which cannot be fired upon with the energy contained in the "kill-pulse" are in the intended path of the "kill-pulse" beam 510. In such embodiments, it may still be desirable to employ shorter poles or other support structures to support the passive anemometers 20 at a height which would not present a hazard to the aircraft used for aerial application of chemicals.

Figure 16:
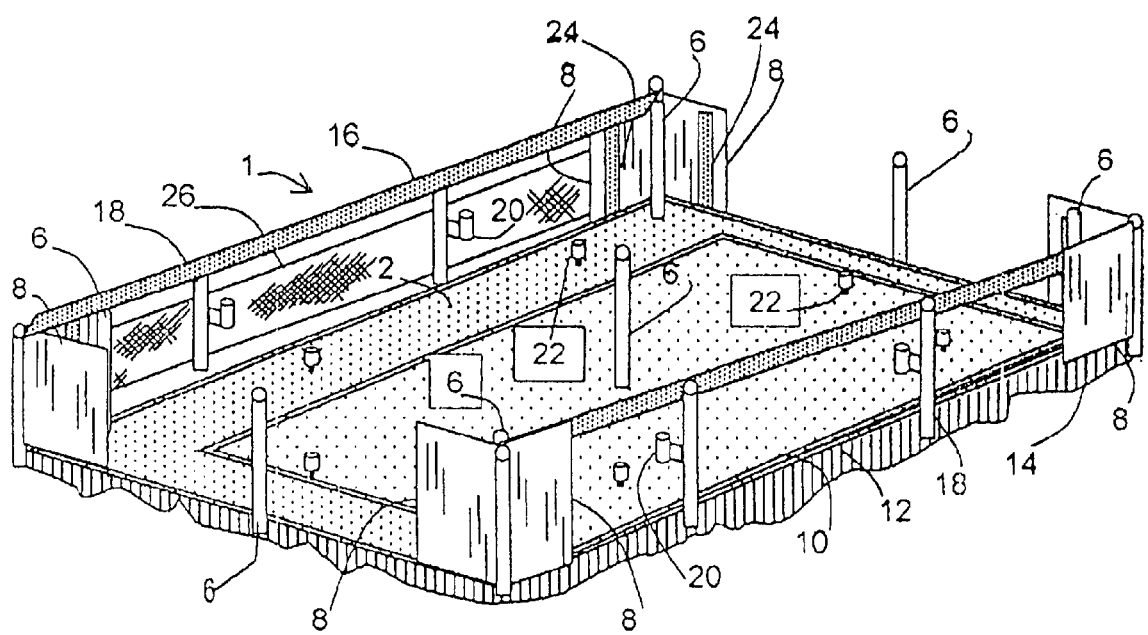
FIG. 16 is a diagrammatic illustration of another alternate embodiment with additional sensor weapons poles and with open sides.

In other embodiments of the instant invention, it may be desirable to add additional sensor or sensor/weapon poles 6 as illustrated in FIG. 16, to reduce the radar and optical sensor range to targets while still making use of the sensor and kill plane backstops 8, 16 and 24. Such additional poles located along the sidewalls should be positioned in an offset position so as not to be on the path between other sensor/weapon poles 6 and kill plane backstops 16, 24, but such that the added sensor/weapon poles could still make use of the sensor and weapon backstops 8, 16 and 24 located along the sides of the protected region. Optionally, as also illustrated in FIG. 16, one or more additional sensor/weapon poles 6 may also be added in the interior of the protected region to aid in the implementation of the overhead boundary zone and overhead kill plane as described earlier. This embodiment may not be desirable for crops requiring aerial application of chemicals due to the potential hazard to low-flying aircraft, but may be of value in embodiments for other protected assets since a sensor/weapon pole in the interior of the protected region could still make use of the overhead kill plane backstops 16 along the sides of the protected region while reducing the range to targets. Sensor/weapon poles located in the interior of the protected region could be of a slightly shorter height than the other sensor weapon/poles so as not to interfere with their respective line-of-sight paths to overhead kill plane backstops 16, or such poles could be made taller to permit enforcement of the overhead boundary zone and kill plane above other obstacles such as trees.

Figure 17:
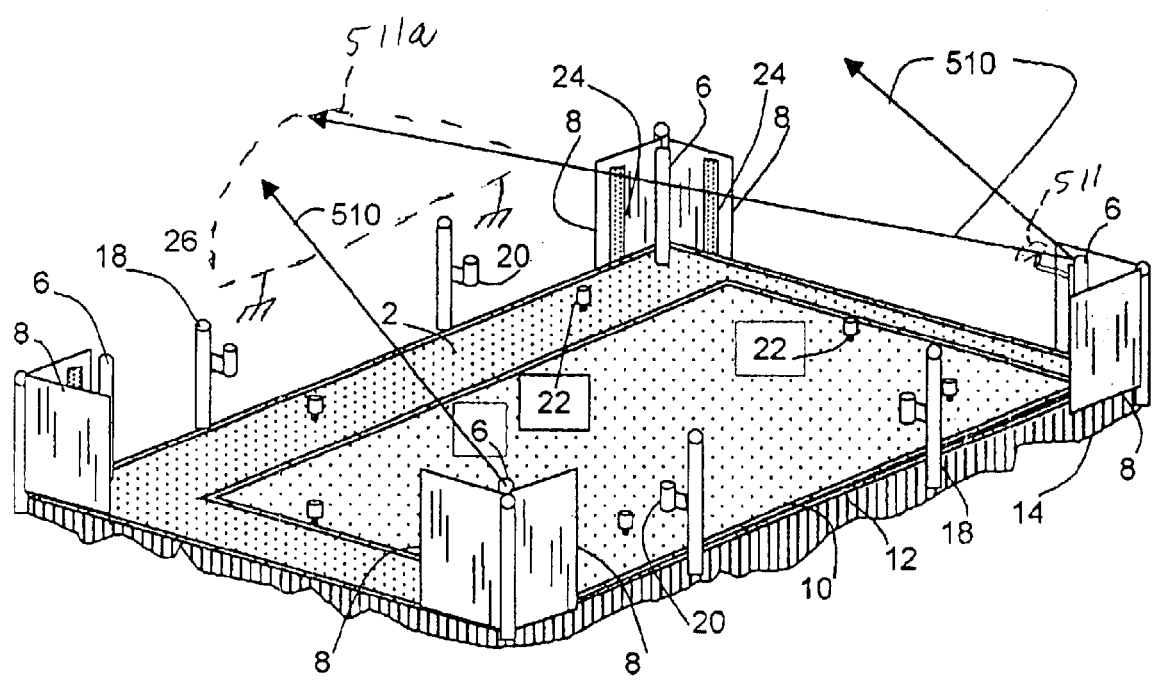
FIG. 17 is a diagrammatic illustration of yet another alternate embodiment showing open ends and no overhead kill plane.

Still other embodiments of the instant invention that do not use the overhead kill plane backstops 16 are feasible, as illustrated in FIG. 17, for employment in areas, particularly in areas of having wide expanses of essentially flat terrain, such as in the Mississippi Delta or other regions of the world, where risks to humans and other valuable assets from use of high energy lasers can be minimized by simply using upward-angled lasers directing an upwardly angled laser beam and mounted at some elevation (e.g., seven to ten feet or more) on poles 6 or other support structures so that the likelihood of a harmful level of laser energy being directed on a human or other valuable non-targeted asset is minimal. In this instance, the upward angle may be relatively shallow so as to minimize inpingement of the beam on an aircraft. In the unlikely event of such an occurrance, the shallow angle of the beam causes the beam to pass closer to the ground and through the densest part of the atmosphere, attenuating the beam to non-harmful power levels. The use of potentially eye-damaging levels of laser energy is permitted for entertainment purposes in outdoor laser light shows (subject to other safety regulations or special waivers) so long as suitable measures, including in some instances the use of opaque shields, are employed to insure the laser energy cannot be directed at low elevations into the eyes of observers or bystanders. Similarly, the use of high energy laser beams emitting from optical apertures mounted at some suitable elevation above local ground level such that the likelihood of harmful levels of laser energy falling upon humans or other valuable nontargeted assets at ground level is essentially eliminated, combined with other safety measures outlined previously, or modified as described below, should permit safe use of the instant invention without the requirement for the overhead kill plane backstops 16. This reduces cost of implementing the invention as installation and maintenance of the overhead kill planes is not required. Other safety measures which it would be prudent to employ in such embodiments include the use of returns from radar and optical sensors, and ranging and discrimination algorithms in the radar subsystems 42, sector laser/optical subsystems 50, safety and security subsystems 32, sector sensor/weapon controllers 40, or system controllers 36, 38 to help ensure that there are no humans or other valuable assets within the destructive portion of the "kill-pulse" beam 510 from a kill laser subsystem 56 of the instant invention. As the materials for developing the beam may be selected so as to develop a beam that is attenuated by the atmosphere, such destructive portion may be selectively limited generally to the distance between sensor poles. The returns may be from radar and optical sensors operating in their normal surveillance modes, but preferable a pre-pulse measurements would be made, similar to that described earlier herein, within a few microseconds or milliseconds before firing the "kill-pulse" beam 510 to help insure no valuable non-targeted asset was in the path of the kill-pulse beam 510 out to a range where the energy in the kill-pulse would still be injurious to a valuable non-targeted asset. The range beyond the target wherein the energy in the kill-pulse beam 510 could still be injurious can be reduced by prudent selection of wavelengths which are readily attenuated in the atmosphere, the use of larger objective focusing optics (which would provide for greater divergence and spreading of the energy to non-injurious levels beyond the point of focus), or various beam-spoiling techniques known to those skilled in the art of the use of lasers and optics. Additionally, templates 511 made of a material capable of safely absorbing or otherwise blocking a "kill-pulse" beam 510 from a laser weapon of the instant invention could be cut to a particular shape (e.g., to match the outline 511a of an inhabited nearby mountaintop as shown by the dashed line showing 511a in FIG. 17) and mounted near a given laser weapon optical aperture so as to block the line-of-sight between the given laser weapon optical aperture and areas to be protected from potential impingement of direct energy from a "kill-pulse" beam.

It is to be noted that only a few instances of kill-pulse beams paths are shown in FIGS. 15, 16, and 17 for clarity and to avoid unnecessary clutter in the Figures. In most embodiments, the sidewall boundary zones and sidewall kill planes may still be employed as described earlier herein. However, some embodiments of the instant invention may be implemented without use of the sensor backstops 8, or even the kill plane backstops 16, 24 and depending upon the size of potentially intruding objects to be detected and engaged and various tradeoffs of risks to protected assets from intruding objects vs personnel safety and other risks from the sensors and weapons of the instant invention.

Figure 18:
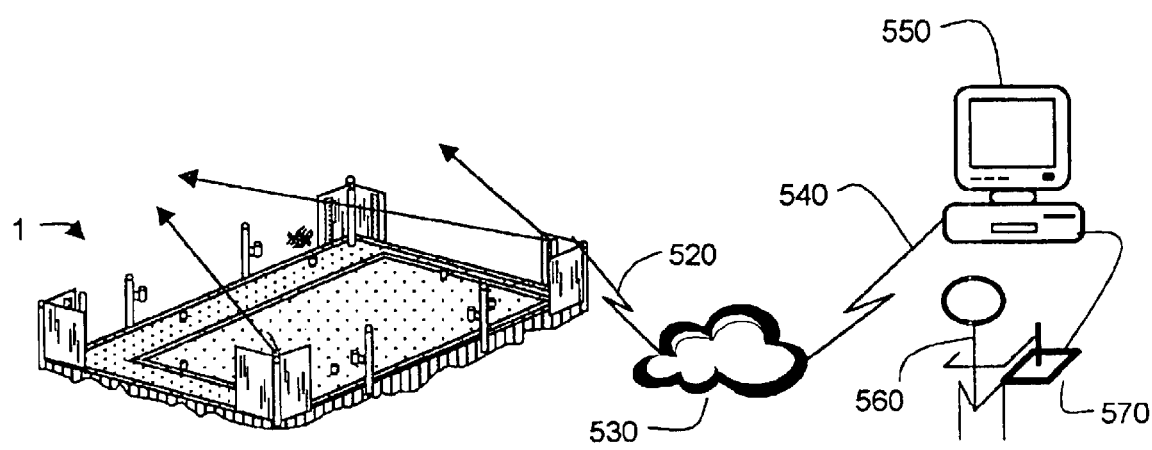
FIG. 18 is an embodiment showing environment of a remote control implementation.

In still another embodiment of the instant invention, as illustrated in FIG. 18, a remote control feature may be added to the portions 1 of the invention located adjacent to a protected region which remote control feature would provide capabilities for information (e.g., position, flight path, wing beat, radar cross section, live video) to be transmitted via a communication link, which may be a wireless link 520 as illustrated, or a wired, fiber optic, or other type of connection, from the assets 1 of the instant invention located in a field environment to one or more human operators 560 interfacing with suitable processing and display equipment 550 via well-known, data and computer communications techniques. The communications techniques between the field assets 1 and the processing and display equipment 550 may be via the Internet 530 as illustrated, connected to the processing and display equipment 550 via a communications link 540 which may be implemented via wireless, wired, fiber optic, or other media, or alternately the communications between the field assets 1 and the processing and display equipment 550 may be via dedicated communications links (e.g., direct short range wireless link) or via other networks.

Based on information presented to the human operator via suitable displays on the processing and display equipment 550, the human operator may operate various controls, such as the joystick 570 illustrated in FIG. 18, or such as the control buttons, levers, and other devices integrated in commercially available computer game controllers and even in many cellular telephone instruments. Operations of said controls results in commands being sent back, via the communications techniques described above, or via alternate routes, to the field assets 1 which commands may be used to effect control of various assets of the system, including, in some embodiments, the pointing and firing of the laser weapon (generally within some constraints imposed for safety and other reasons) so as to permit remotely located human operators to thereby control the engagement of various targets. Such an implementation may be provided to permit human override of the field assets 1 when needed for various reasons, or to provide a remote control capability which could be practiced as a video game wherein participants are permitted, in a live-fire mode, to actually control the firing of the lasers, or other weapon assets (such as unmanned aerial vehicles) of the system described earlier, to engage airborne targets detected by the sensor elements of the system. Participants could be scored, for example, based on their ability to use the detected object observables transmitted from the field assets, and presented to participants via suitable displays 550, to correctly identify pests vs beneficials or neutrals and to the accurately fire on and kill or incapacitate pests. In such implementations, an inherent target classification and discrimination capability of the system, as described earlier herein, would generally be used to score participants and to override commands of participants to prevent firing upon or otherwise engaging non-pests.

The interface capabilities needed to effect the remote control capabilities described above could be built by those skilled in such arts into the System Controller 36, into the Sector Sensor/Weapon Controllers 40 and Radar Subsystems 42, or into various other portions of the field assets 1.

Having thus described our invention and the manner of its use, it should be apparent from our disclosure to one skilled in the arts to which the subject application pertains that incidental changes may be made thereto that fairly fall within the scope of the following appended claims;

REFERENCES

Williams, Michael R., 1998, 1997 Survey of Insect Losses, 1998 Proceedings, Beltwide Cotton Conferences.

Michelsen, Axel, Flemming Fink, Matija Gogala, and Dieter Traue, *Plants as Transmission Channels for Insect Vibrational Songs*, Behavioral Ecology and Sociobiology (1982) 11:269–281, Springer-Verlag 1982

Bell, Paul D., *Transmission of Vibrations Along Plant Stems: Implications for Insect Communication*, New York Entomological Society LXXXVIII(3), 1980, pp. 210–216

Claridge, M. F., *Acoustic Signals in the Homoptera: Behavior, Taxonomy, and Evolution*, Ann. Rev. Entomol. 1985, 30:297–317, Annual Reviews, Inc. 1985—Instruction & Service Manual, 55×Laser Vibrometer, DANTEC, DANTEC ELEKTRONIK, Medicinsk og Videnskabeligt Maleudstyr A/S, Mileparken 22, DK-2740 Skovlunde, Denmark, September 1984

Schaefer, G. W., *Radar Observations of Insect Flight*, pp.157–197 (Chapter 8), *R.E.S. Symposium 7: Insect Flight*, Symposia of the Royal Entomological Society of London: Number Seven, Insect Flight, edited by R. C. Rainey, A Halsted Press Book, John Wiley and Sons, New York, 1976

Wolf, Wayne W., *Radar Observations and Collections of Insects in the Gulf of Mexico*, pp. 221–234 (Chapter 16), *Insect Flight: Dispersion and Migration*, Edited by W. Danthanarayana, Springer-Verlag, New York, Heidelberg, Berlin 1986

Wolf, W. W., C. R. Vaughn, R. Harris, G. M. Loper, *Insect Radar Cross-sections for Aeriel Density Measurements and Target Classification*, Transactions of the ASAE, Vol. 36, No.3, 949–954, American Society of Agricultural Engineers, 2950 Niles Rd., St. Joseph, Mich. 49085-9659, May/June 1993

We claim:

1. A system for detecting and disabling or killing harmful airborne biota, particularly insects, comprising:

at least one energy-transmitting transmitter positioned to emit a beam of detection energy over or around an area to be protected from said harmful airborne biota, a receiver of a return signal of said detection energy from said harmful airborne biota, one or more data processors for processing said return signal and identifying said airborne biota, a harmful airborne biota killing or disabling system responsive to said one or more data processors.

2. A system as set forth in claim 1 wherein said energy-transmitting transmitter comprises a radar beam.

3. A system as set forth in claim 1 wherein said harmful airborne biota killing or disabling system comprises a laser beam.

4. A system as set forth in claim 1 wherein said harmful airborne biota killing or disabling system comprises a range-limited beam of energy.

5. A system as set forth in claim 4 wherein said range-limited beam of energy further comprises an energy beam that is attenuated by atmosphere.

6. A system as set forth in claim 4 wherein said range-limited beam of energy further comprises focusing said range-limited beam of energy.

7. A system as set forth in claim 4 further comprising a backstop for said range-limited beam of energy.

8. A system as set forth in claim 4 wherein said range-limited beam of energy, is tilted upward at a relatively shallow angle.

9. A system as set forth in claim 8 wherein said backstop is selectively positioned to block an upwardly tilted said range-limited beam of energy from an elevated feature so that said range-limited beam of energy cannot impinge on said elevated feature.

10. A system as set forth in claim 1 wherein said energy transmitting transmitter, said receiver and said a harmful airborne biota killing or disabling system are mounted on an elevated structure above said area to be protected.

11. A system as set forth in claim 10 wherein at least one said elevated structure is positioned within said area to be protected.

12. A system as set forth in claim 10 further comprising a plurality of said elevated structure positioned around said area to be protected.

* * * * *